(12) United States Patent
Vertes

(10) Patent No.: US 7,840,940 B2
(45) Date of Patent: Nov. 23, 2010

(54) SEMANTIC MANAGEMENT METHOD FOR LOGGING OR REPLAYING NON-DETERMINISTIC OPERATIONS WITHIN THE EXECUTION OF AN APPLICATION PROCESS

(75) Inventor: Marc Philippe Vertes, Saint-Lys (FR)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 11/337,264

(22) Filed: Jan. 20, 2006

(65) Prior Publication Data

US 2006/0167951 A1 Jul. 27, 2006

(30) Foreign Application Priority Data

Jan. 21, 2005 (FR) ................................. 05 00611

(51) Int. Cl.
*G06F 9/44* (2006.01)
(52) U.S. Cl. .................... 717/120; 717/111; 717/131
(58) Field of Classification Search ................. None
See application file for complete search history.

(56) References Cited

U.S. PATENT DOCUMENTS 7,574,692 B2 * 8/2009 Herscu ........................ 717/116

* cited by examiner

*Primary Examiner*—Chuck O Kendall
(74) *Attorney, Agent, or Firm*—Yee & Associates, P.C.; Matthew W. Baca

(57) ABSTRACT

This invention relates to a management method, during a logging or a replay, of software operations returning a non-deterministic result within the execution of an application process within a computer (OP).

This method comprising the following steps:
  execution, from at least one executable file, of a program instruction initiating the implementation of the managed operation;
  intervention (TMF, TC1, TC2) by a management software agent (AG) external to the managed application (AOP), in the software functioning of the computer (OP) in order that the managed process or the managed application takes account of a result datum (DR) reproducible in an unambiguous manner from the state of the reproducible resources (RRepr) before the managed operation.

22 Claims, 14 Drawing Sheets

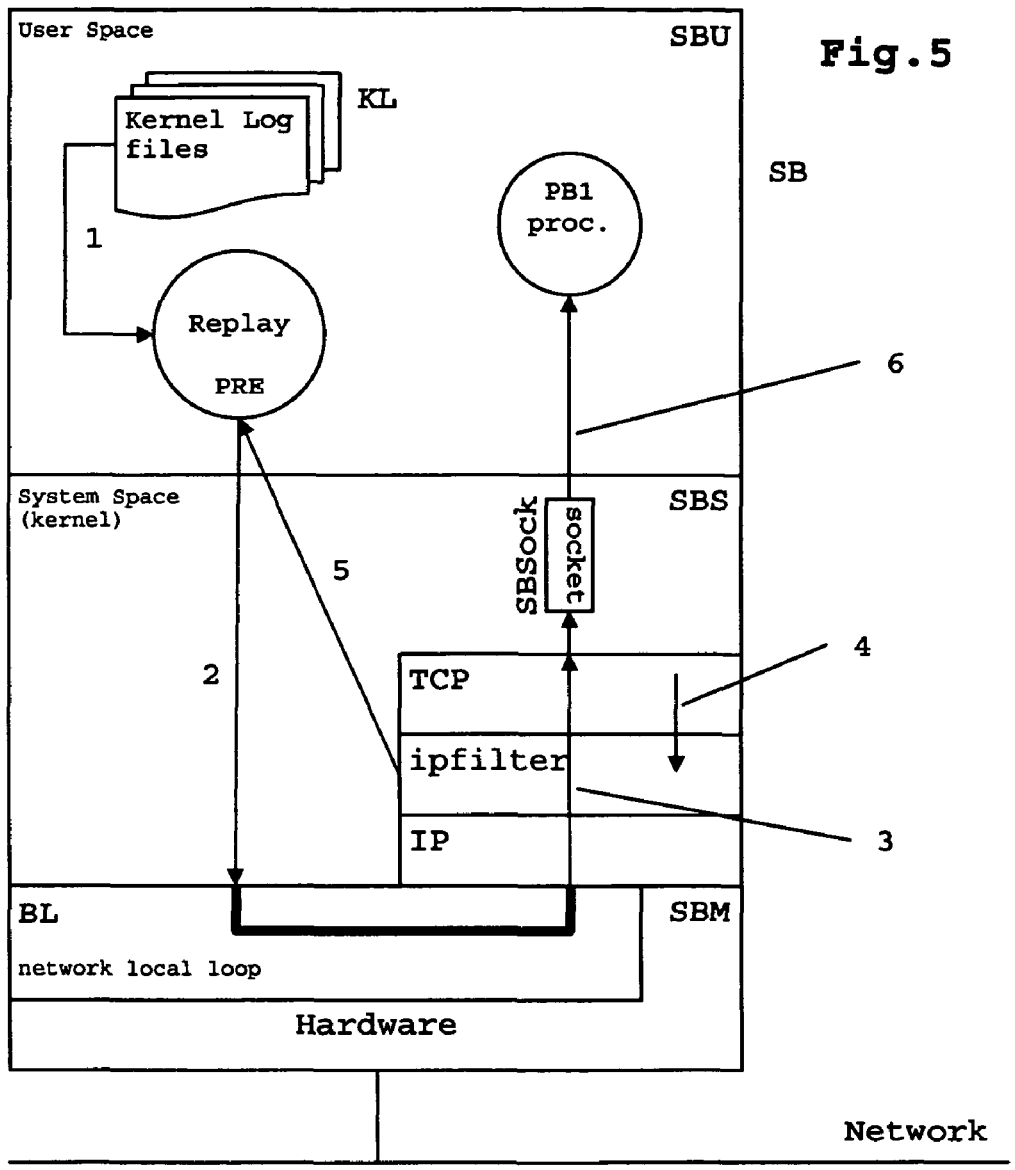

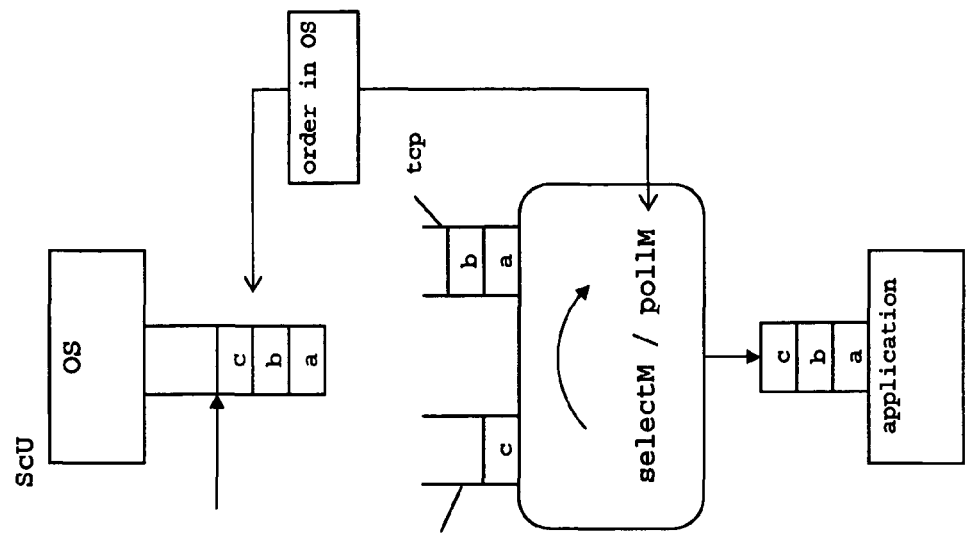
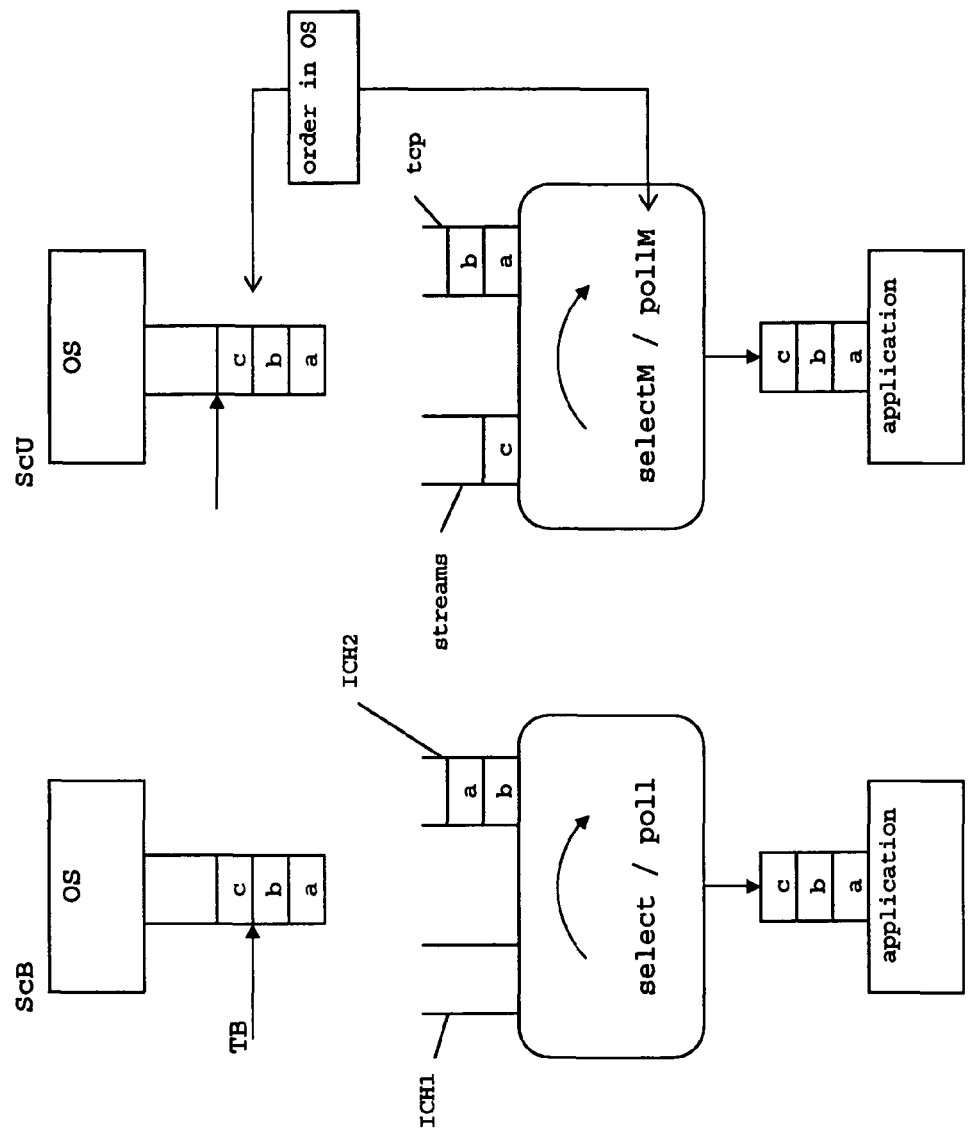
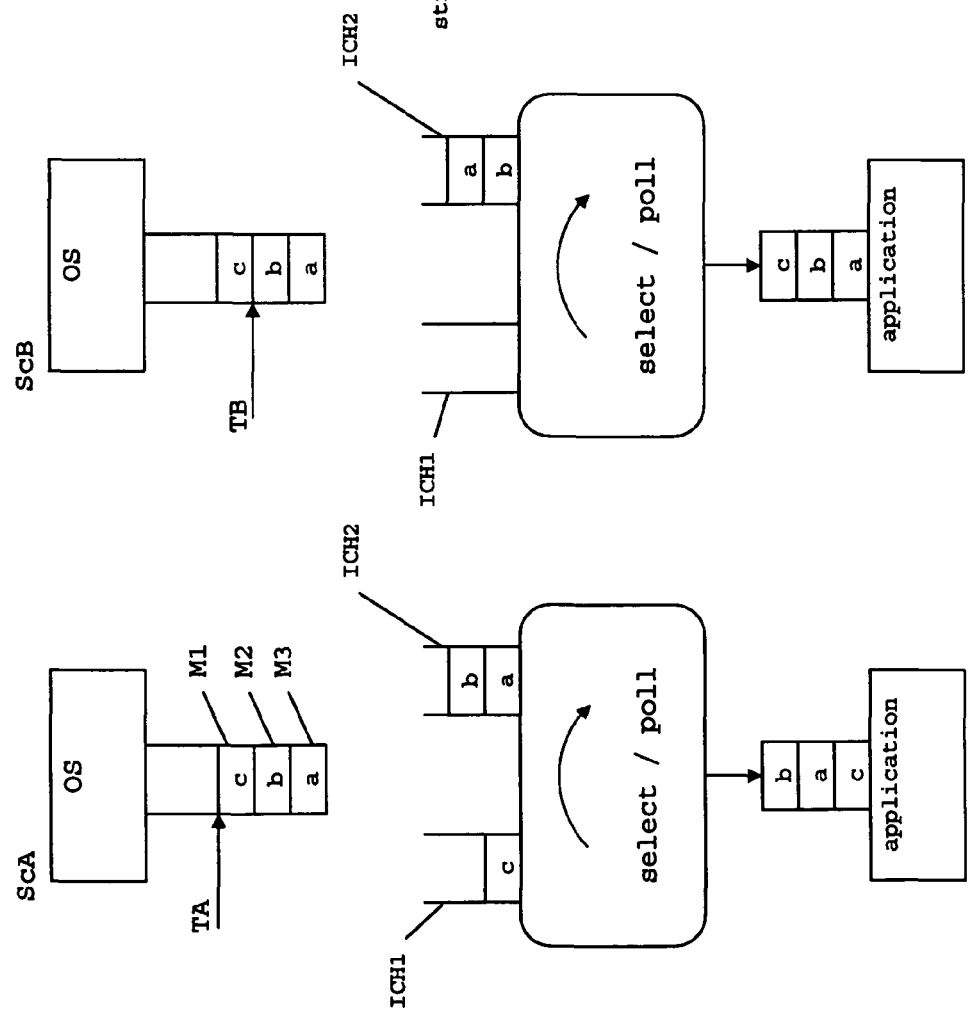

SEMANTIC MANAGEMENT METHOD FOR LOGGING OR REPLAYING NON-DETERMINISTIC OPERATIONS WITHIN THE EXECUTION OF AN APPLICATION PROCESS

FIELD OF THE INVENTION

This invention relates to a management method, more particularly by recording or external monitoring, for software operations carried out during the execution of an application process executed on a computer. This management applies in particular to the recording of operations in the form of logging data, or to a replay of operations according to a given execution corresponding to a previously logged execution.

The method is particularly advantageously applied to operations performing the internal events of this process, which can itself be part of a multi-process and/or multi-computer software application.

The invention also relates to a system implementing such a method in the functioning management of the software applications that executes.

The field of the invention is that of computers, isolated or in networks or "clusters" of computers formed from a number of computers working together. These clusters are used to execute software applications providing one or more services to users. Such an application can be single or multi-process, and be executed on a single computer or distributed over a number of computers, for example as a distributed application of the MPI ("Message Passing Interface") type or "Shared Memory" type.

In particular, the invention enables functioning management to be carried out, within the cluster, of such an application termed master or primary, for example by another software application termed intermediate application, for example an application of the "middleware" type. This functioning management may comprise, inter alia, the operations of replication, redistribution, reliabilization, or tracing or debugging of all or some of this application, within the primary node or in collaboration with other nodes termed secondary.

BACKGROUND ART

In the context of this functioning management, it is often useful to log the functioning of the primary application or of one of its processes, i.e. to record the data representing this functioning, enabling the running to be reconstituted. While the primary application is running, this data is then generated in the form of logging data and is transmitted to one or more secondary nodes for storage and backup.

For example, in order to trace and study the functioning of the primary application in detail, it is then possible to study or to reconstitute this operation, later on or remotely, in a controlled and monitored manner.

Also, as an example, if the primary application experiences a failure, in particular a hardware failure, it is then possible to create a new standby application on a secondary node in order to replace the services provided by the primary application. This standby application can then be created in a known state, for example a restart point state recorded previously. From the logging data of the primary application, it is then possible to force the standby application to reconstitute the execution of the primary application up to the time of the failure. After this reconstitution, or replay, the standby application is in the same state as the application until the last event, the logging data of which have been received outside the primary node. If all the events preceding the failure have indeed been logged and transmitted up to the failure, the standby application can then take over with little or no interruption of the service for the users.

However, many existing applications do not currently have such management functionalities, and it would be too complex and costly to modify them in order to add these to them.

The solution which consists of implementing these functionalities in the system software of the computer or of the primary node presents some considerable drawbacks, such as the risks of errors, instability or incompatibility within the network and the requirement for special skills in the field of systems software.

In addition, a solution is proposed by the authors of this invention, which consists of these management functionalities being taken over by an intermediate application which is executed mainly in the user memory space and requires only a few modifications within the system software itself.

However, in this type of solution, inter alia, the creation and processing of logging data, as well as its transmission from the primary node to the secondary node, represent a significant calculation load with respect to the execution of the primary application itself, as well as for the communication networks used. In the prior art, the master application then experiences such a loss of performance that, often, this functioning management cannot be used satisfactorily in exploitation conditions.

In fact, in order to be able to represent in a coherent manner, or even a complete manner, the execution of the primary application, the events to be recorded and to be transmitted are often numerous. Moreover, the majority of these events correspond to operations the execution of which is very fast, in particular the events which are internal to the hardware or software resources of the primary node, for example, a system call requesting the assignment of a semaphore or reading of an item of data in memory.

By contrast, for each of these events, the generation and storage, as well as the transmission of the logging data is a much longer operation, in particular for the internal events.

In fact, logging each event is in itself a process which requires at least one and frequently a number of software operations, each of which constitutes a load and a working time at least equal to the logged event in itself. According to the implementations and the type of internal event, the logging adds for each event an increased load or working time larger by a factor which commonly ranges from 100 to 10,000.

Furthermore, the hardware and software protocols used for transmission to the outside of a computer have performances which are in general poor in relation to the number of events logged, which is also a disturbance to the use of the network as well as a bottleneck for the performances of the master application.

Certain solutions exist which allow the number of events to be logged to be reduced, in particular by not logging events of a non-deterministic type.

An event, or the operation which constitutes it, in particular a software operation, can be qualified as deterministic if the result of its execution depends only on the initial conditions which existed at the time of this initiation. More particularly, in the context of managing a unitary operation or an execution or a functioning as described here, an operation is termed deterministic if it is deterministic from the point of view of the process which initiated it, i.e. if the result which it sends to this process depends only on the initial state of this process. Similarly, a contiguous succession of deterministic operations may constitute itself a deterministic sequence.

Within the running of an application process, many of the operations performed are deterministic, in particular among internal operations. For example, mathematical or logical type internal operations will be deterministic more often than not if they affect only those resources forming part of the initial state of this process, and which it alone can modify.

A contrario, some operations applying to shared resources are often non-deterministic vis-à-vis such a process. For example, a request for assignment of a shared semaphore or a "lock" covering a memory zone shared with other processes could be non-deterministic. In fact, the result, i.e. the obtaining or otherwise of this lock or this attribution might depend on the state or actions of other processes, which sometimes would have reserved or not reserved this resource.

However, the replay and, in particular, the logging of non-deterministic events still constitute a loss of performance which could usefully be reduced. In particular while running the master application, the logging operations represent a work load for the operational node, and can be the cause of a fall-off in performance due to the action of the intermediate application.

SUMMARY OF THE INVENTION

One aim of the invention is to overcome all or some of these drawbacks.

The invention aims in particular to obtain:
- a reduction in the workload generated by the logging or processing of internal events;
- a reduction in the volume of logging data to be transmitted;
- a reduction in the number of non-deterministic events where the result must be stored to be able to produce a replay giving the same result.

To this end, the invention proposes a method for managing a software operation carried out within the execution of an application process, termed managed process, executed by at least one computer within the context of a managed application, termed managed application. Said operation is carried out by at least one software resource, termed processing agent, and returns to the managed process, or to the managed application, at least one result datum.

This result datum is obtained according to an operation processing comprising at least one phase intrinsically non-deterministic with respect to the state, before said operation, of at least a first set of resources, termed reproducible resources, included in the resources accessible by the managed process or by the managed application.

This method comprises the following steps:
- execution, from at least one executable file, of a program instruction initiating the implementation of the managed operation;
- intervention by a management software agent, external to the managed application, in the software functioning of the computer in order that the managed process or the managed application takes account of a result datum reproducible in an unambiguous manner from the state of the reproducible resources before the managed operation.

The invention therefore can produce a management of non-deterministic operations which makes them deterministic with respect to certain elements, and therefore predictable in a certain manner as soon as these elements are reproduced identically or in a corresponding state.

The obtaining of this deterministic nature constitutes a change of functioning of the processing of the operation by the processing agent, for example, an agent of the operating system, and therefore a change in the interpretation given to the program instruction of the executable file. It is therefore possible to speak of a "semantic change", applied to the functional syntax of the processing agent by the intervention of the management agent.

For such a semantic change, the use of a management agent external to the managed application enables a transparent management vis-a-vis this application, which can implement this management in order to manage applications which have not been designed for this, by modifying them only slightly or not at all, for example in their original or "official" version, often qualified in English by "legacy applications".

Therefore, making deterministic all or some of the normally non-deterministic operations of a managed process enables in particular the extension to these operations of optimised management techniques which function only, or better, with deterministic or predictable operations. These can be, for example, reduced, or partial, or delayed logging techniques, for example, by logging only the position of the operations and not their result, or even by logging only the only operations remaining non-deterministic.

With respect to its normal functioning, i.e. without intervention by the management agent, the implementation of this semantic change could lead to a reduction in performance of the processing agent. In numerous cases, however, this drawback is largely compensated for by the advantages which the invention brings.

It should be noted that the invention can apply to the management of the operations of an isolated process, but also to the management of operations by several processes within a single managed application. All the operational characteristics of the invention, for example the concept of reproducible and determinant resources or that of determinant information, may then also be understood as applying globally to the managed application, even if they are not systematically present in the management of each of the processes of this managed application.

In particular, the management agent may function outside the processing agent.

The use of a management agent outside the processing agent, which is, for example, an element of the system software, enables also to limit or avoid interventions in the system software of the computer which executes the managed application, which brings flexibility and reliability to the embodiment of the invention as well as to its use.

In particular, the reproducible resources may be resources the state of which depends exclusively on the execution of the managed process or of the managed application.

In the case of a logging for replay, starting from a replay start state, the replay of all the operations may then suffice in order to obtain that the state of these reproducible resources on completion of the replay is the same as the state of the corresponding resources during the logging on completion of the same operations.

According to one feature, the intervention step comprises a modification of the functioning of the processing agent in order to make said functioning deterministic with respect to the reproducible resources.

More particularly, the processing of the operation is intrinsically deterministic with respect to the state of a second set of resources, termed determinant resources, which may include all or some of the reproducible resources, and in that the modification of the functioning of the processing agent is carried out or controlled by the management agent based in a manner on data, termed determinant, originating from the state of the determinant resources before the managed operation.

Alternatively, or in a combined manner, the intervention step may also comprise a compensation process, of a deterministic nature with respect to the determinant resources. This compensation process thus compensates the non-deterministic nature of said operation processing, by using at least one item of data termed determinant, depending on the determinant resources.

In particular, the compensation process moreover comprises the following steps:

interception of the result datum returned by the operation processing, before its being taken into account by the managed process or by the managed application;

from said result datum, calculation of a compensated result datum;

forwarding said result datum to the managed process or to the managed application instead of the result datum returned by the operation processing.

The operation processing may also receive at least one datum termed input, originating from at least one resource, termed target resource, external to the reproducible resources, the compensation process moreover comprising the following steps:

interception of the input datum before it is taken into account by the operation processing;

from said input datum, calculation of a compensated input datum;

forwarding said compensated input datum to the operation processing instead of the input datum originating from the target resource.

These determinant resources may comprise, for example, processes external to the managed process or to the managed application, but which share certain resources with the managed process or with the managed application. Knowledge of the state or of the development of these determinant resources, for example the order of their accesses to a shared resource, may constitute such an item of determinant datum.

While logging, this determinant datum enables the management agent to modify the functioning of the processing agent or the data which it exchanges to carry out the semantic change, but does not need to be logged.

During a replay, the determinant resources can sometimes be different from those which existed during the logging. However, the functioning of the management agent will then use different determinant data in order to obtain the same deterministic result, for example using determinant data obtained or calculated by itself. The management agent may thus carry out a semantic change corresponding to or identical to that carried out while logging, and which modifies the result of the operation in the same manner, without having knowledge of the determinant resources which existed while logging, nor of the determinant data which were provided at that time by these determinant resources.

The invention applies advantageously to the case of a logging of a sequence of operations, within the execution of a logged process belonging to a logged application, carried out in order to store at least one log file enabling a restart process to replay a sequence, termed replayed, of operations corresponding to the operations of the logged sequence.

Within this sequence, the invention thus proposes to manage at least one non-deterministic operation, termed logged operation, in order to make it deterministic with respect to the logged process or with respect to the logged application.

In a combined manner or in an independent manner, the invention also applies to the case of a replay of a sequence of operations within the execution of a restart process belonging to a restart application, using the logging data representing the execution of a logged sequence of operations within the execution of a logged process.

For at least one non-deterministic operation, termed replayed operation, belonging to said replayed sequence and corresponding to a logged operation within said logged sequence, the invention then proposes to manage said replayed operation for making it deterministic in order that the restart process takes account of a result datum corresponding to the result received by the logged process on completion of the logged operation.

According to one feature, the intervention phase comprises at least one sub-phase dependent in a univocal manner on at least one datum, termed semantic change parameter, varying during the execution of the replayed sequence in a similar manner as during the execution of the logged sequence.

For the operations of a same type during a logged sequence, it is therefore possible to design for the management agent a behaviour which is adaptable as required, for example with the objective of limiting the performance losses due to the semantic change. Provided that the variations of this parameter are reflected in an identical manner or in a corresponding manner during the replay, the replay will remain exact with respect to the logging.

In particular, such a semantic change parameter may present at least one variation depending in a univocal manner on the state of the reproducible resources.

Due to the fact that the reproducible resources are modified in the same way during the replay, the variations of this parameter during the replay will then follow the variations experienced while logging.

Such a semantic change parameter may also present at least one variation, termed logged variation, which is stored in the form of logging data, usable during the replay in order to modify the semantic change parameter in a manner corresponding to said logged variation.

It is thus possible to adapt this parameter to the conditions existing during the logging but which may differ during the replay, for example measured workload indicators or performance indicators.

The method according to the invention is particularly interesting for use when it manages all the operations implementing, within the managed sequence, events internal to the managed process, or to the application, or to the computer which executes them.

In coordination with a management of external events, the invention may therefore manage the entire execution of the process, in particular to enable a logging during exploitation, together with limiting any slowing down of the managed application.

During a replay, the restart process may advantageously be launched and then executed by itself from its executable file(s). During the execution of this replay, which could be qualified as "passive", the replayed operations thus themselves provide a result each time that their nature orders this.

The method according to the invention may thus be used in order to manage at least one operation initiated by an instruction executed from an executable file and comprising a call to a routine, termed original, external to said executable file, the execution of said instruction making a call to a routine termed modified, instead of said original routine, this modified routine carrying out or initiating the implementation of the method.

This type of intervention carried out by interposition brings, in particular, flexibility in the implementation and the use, as well as transparency vis-a-vis the managed application, and can therefore bring robustness and reliability to the working of this management.

More particularly, the modified routine comprises at least one instruction executed within the system software and making a call to at least one management software agent, managing the implementation of the method and executed in the user memory space of the managed process computer.

It is therefore possible to minimise the modifications to be brought to the system configuration of the computers having to execute the managed applications, in particular while logging or while replaying, at the same time implementing the management agent as an application agent within a management application, which manages the functioning of other applications.

The method according to the invention may advantageously be used in order to manage at least one operation comprising at least one process executed by the system software or within the system memory space of the computer.

It is used advantageously to manage at least one operation returning a result dependent on the state or on the development of a resource shared between several processes or between several applications.

One or more items among the determinant data may originate in particular from the system software or from the operating system of the computer, for example a resource state or an order of occurrence of events external to the reproducible resources but internal to the determinant resources.

As an example, the invention can be implemented to manage a data reading operation in a buffer memory comprising at least one queue for the reception of software objects in the form of groups of data of sizes capable of being different. This can be the case, for example, of a system call initiated by a "read" instruction in a UNIX-compatible or LINUX-compatible system, with a management agent receiving from the system software at least one item of determinant data representing the size of the next object, and more particularly of the next group of data to be read in said queue. The management agent then uses said item of determinant data in order to read or take into account in said buffer memory only the data corresponding to the size of the next object to be read.

The object read can therefore constitute all or part of another software object, possibly structured or variable. The invention therefore enables the "read" operation to behave in a deterministic manner towards the received data, while reading it according to the exact grouping which it had during its reception in the buffer memory, and this regardless of the use which will be made of it later or of the structure which it represents.

Another example may be the management of an operation to read data originating from a plurality of reception channels, each comprising at least one queue for the reception of software objects. This may be, for example, a system call initiated by a "select" or "poll" instruction in a UNIX-compatible or LINUX-compatible system, with a management agent receiving from the system software at least one item of determinant data representing the order of arrival of the different objects, and using said item of determinant data in order to read or to take account said objects in an order corresponding to that of their arrival.

For these operations, the invention thus enables to avoid a non-deterministic character which could exist in situations of the "race conditions" type, caused for example by variations in the speeds of transmission of the data received in one or more of these reception channels, or by different speeds of execution of several parallel processes.

Within the scope of an improvement in simulation or replay functionalities, another objective of the invention is to improve the functioning management of an application or of at least one of these processes.

The method according to the invention then performs an functioning management of at least one application process termed logged and comprises the following steps:

logging all of the events of at least one given type occurring during the execution of said logged process since a given point, termed restart, and up to a point, termed interruption, and storage of a log originating from said logging;

starting from a restart process in a state corresponding to the restart point state of the logged process, replaying said events from said log by said restart process, thus bringing the restart process into a state corresponding to the state of the logged process at the interruption point.

The state of the logged process at the restart point may in particular be captured and stored in the form of restart point data, which is used to restore the restart process to the restart point state before applying the replay step to it.

The method according to the invention may in particular be used to perform a replay of a succession of events comprising external events as well as internal events. The invention then proposes carrying out the replay of the external events by injection or simulation of each of these external events with the restart process. The internal events which follow each external event in the execution of the replay are then executed by the restart process, under its own initiative in reaction to the occurrence and/or the processing of the external event which immediately precedes them. The restart process then performs the replay of at least one logged sequence of internal events in reaction to the occurrence of an external event triggered by an external replay agent.

Within the functioning management functionalities, an objective of the invention is also to improve the tools for debugging or for analysing or for reproducing at least one part of the functioning of an application, or of at least one of the processes of this application.

The functioning management may then perform a monitoring of the execution of an application, termed traced application, for example within the context of the debugging of this application. This monitoring is then applied to at least one process of the traced application and comprising the following steps:

from a given state of the traced application, logging a plurality of successive and contiguous logged sequences constituting a studied sequence within the execution of the traced application;

producing a controlled succession of replay steps producing a controlled execution of the succession of the logged sequences, thus producing a replay of the studied sequence according to a controlled rhythm.

Within the functioning management functionalities, an objective of the invention is also to improve the reliabilization tools of the functioning of an application, or of at least one of these processes.

Such reliabilization may be obtained in particular through the maintenance of improved continuity of operation of the application from the point of view of the services which it provides to its clients. On a failure, this continuity may be total, i.e. the clients do not have to restart the least operation to obtain the same service. Such continuity may also be partial, i.e. by reducing as far as possible the number and/or complexity of the operations which clients will have to repeat to do in extra to obtain the same service or a part of this service.

Within this context, the invention proposes to implement the functioning management method to reliabilize the functioning of a first application, termed reliabilized application, executed in at least one primary node, termed operational node, of a communicating multi-computer architecture, termed cluster.

This reliabilization comprises a restoration, into a state corresponding to the state of the reliabilized application at a restart point, of a second application termed stand-by, in a second cluster node, termed standby node.

Depending on the embodiments or depending on the situations, this restoration may be done in the absence of any failure and as a preventive measure, or be performed from data stored previously, after detecting a failure.

This reliabilization also comprises the following steps:
logging the running of the reliabilized application from the restart point, and storage, outside the operational node, of logged events in at least one log file;
detecting a failure within the operatonal node;
using said log file to replay in the standby application the events logged in the reliabilized application since the restart point, thus restoring the standby application to a state corresponding to the state of the reliabilized application after the last logged event.

The invention also proposes a system comprising a computer implementing such a management method, or a network of computers working together and including at least one such computer.

More particularly, the invention proposes such a network using an application of the middleware type implementing the method according to the invention in order to manage the functioning of at least one application executed within said network.

The invention is applicable in particular within an environment of the "middleware" type, for example managing a network and/or applications distributed over one or more networks.

BRIEF DESCRIPTION OF THE DRAWINGS

Other features and advantages of the invention will become apparent from the detailed description of a method of embodiment, which is in no way limitative, and the appended drawings in which:

FIG. 5 is a symbolic diagram illustrating the replay functioning of logged external events while updating a restart application on a secondary node;

FIGS. 13 and 14 are symbolic diagrams illustrating the non-determinism of an data receiving operation in the application, from two contending channels of the operating system, by the "select" and "poll" routines in a system of the "Unix" type;

FIG. 15 is a symbolic diagram illustrating one behaviour of this same routine, made deterministic by dynamic semantic changing;

DETAILED DESCRIPTION OF THE PREFERRED EMBODIMENT

Figure 1:
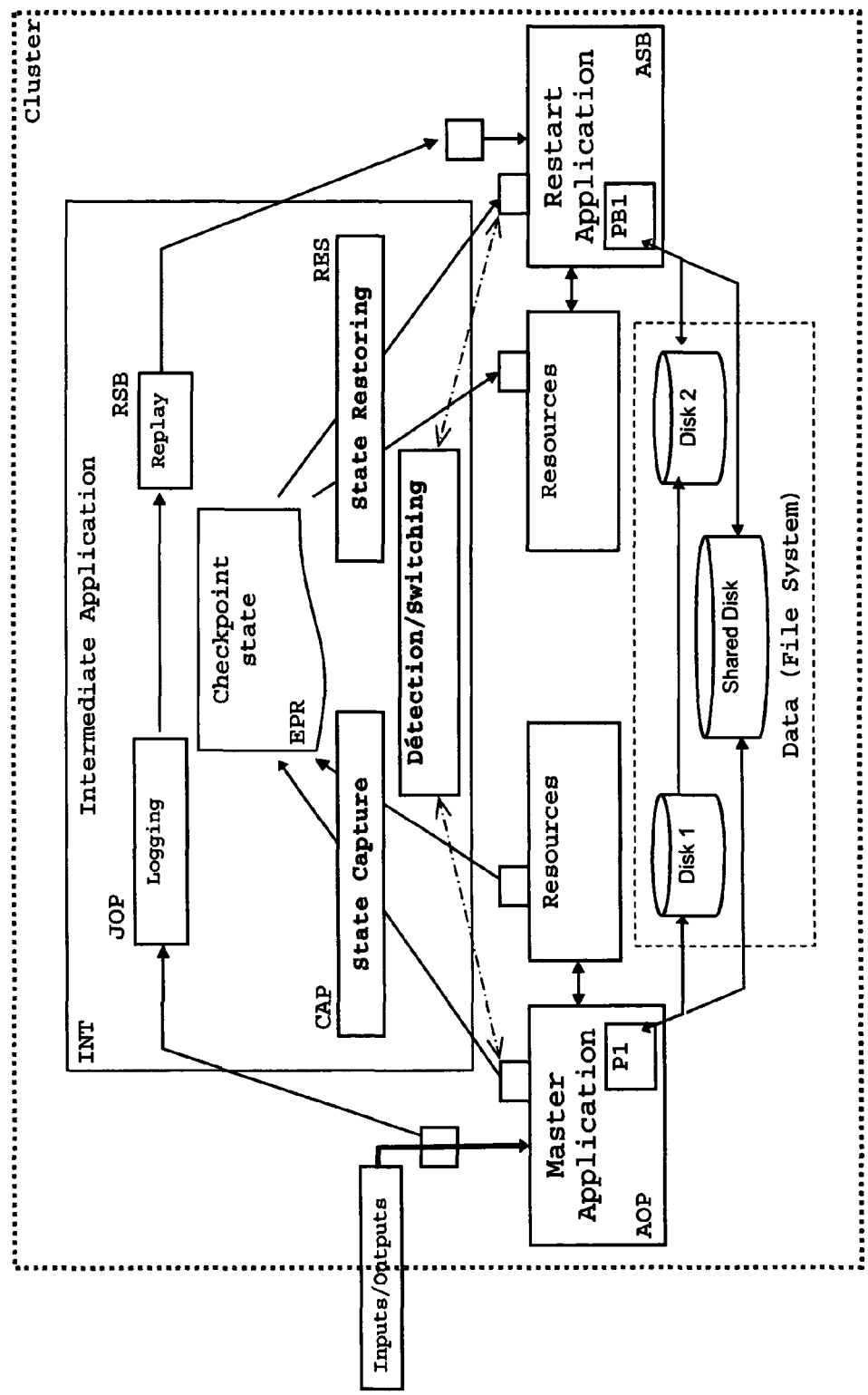
FIG. 1 is a symbolic diagram illustrating the functional architecture of an intermediate application implementing the invention.

FIG. 1 illustrates the functional architecture of an intermediate application implementing the invention;

Within a cluster, an AOP master application, for example a transactional application, provides a certain number of services to users or clients, in particular by input and output of data in different forms. Within the cluster, this application can be single or multi-task (multi-process or multi-threads) and uses a certain number of resources. In particular, these resources can be data, for example in the form of spaces of work memory, shared memory, or data files, or can be state indicators, for example, in the form of semaphores or mutex.

The master application is executed on one or more computers forming a node, termed the operating node OP or the primary node. A functioning management application, termed the intermediate application INT, is executed in one or more parts, in one or more cluster nodes.

According to the embodiments, this intermediate application can deal with different aspects of the master application functioning within the cluster. Such an intermediate application INT can in particular work in parallel with an intermediate cluster management software of the "middleware" type, be integrated with such a middleware, or be itself a form of middleware.

Through the functionalities described here, the intermediate application INT can be used in particular to produce a replication of all or part of a master application in the cluster. The replication of a master application can provide another application which will then be termed replay application.

The functionalities described here, in particular in connection with such replication, also allows the implementation of reliability features for the master application, or tracking or studying this application to implement "debugging", adjustment or development tasks. A use for reliability implementing will include, for example, the restart application as a backup or replacement application. A use in tracking or debugging will comprise, for example, a logging JOP and/or a replay RSB of events, as described hereafter, according to a slowed or controlled rhythm, of logged events.

The embodiments applied to reliability features are therefore described just here as non-limitative examples.

At different points when running the AOP master application to be made reliable, termed restart points or "checkpoints", regularly or on event, the intermediate application INT creates or updates at least one restart application ASB executed on a node termed secondary, or "stand by" SB.

This restart application is created or updated, for example by a method of replication by capturing and restoring the application, termed restart method. Said method of replication comprises capture operations CAP of the state of the master application, followed by restoration operations RES of this state, i.e. the state of its processes and of all or part of the resources which it uses.

During such a capture operation CAP, the state of the AOP master application is backed up in the form of data forming a checkpoint state EPR.

Some of the master application's resources, in particular data files representing a large volume on means of storage such as hard disks, can be updated on-the-fly into several copies on several different storage media, constituting restart data files on mirror disks or shared disks. In this case, the data forming a checkpoint state can comprise information constituting references to these restart data files.

When a checkpointing or a replication is based on a capture state including all the execution environment and the master application resources, either directly or by references to replay data files, said checkpoint or said replication can be termed holistic.

From the data of a checkpoint state EPR, the intermediate application INT can implement a restoration RES, by creating or updating a restart application ASB. Said restoration can be implemented regularly or on initiating event, for example at the request of an administrator or a mechanism for managing the cluster workload. This restoration can also be implemented after a failure of the operational node, detected by means of detection, the restart application then being capable of being used as a permanent or non-permanent backup application.

If necessary, the intermediate application organizes a switching of all or part of the master application's services to one or more restart applications. In order that this switching is made transparently for the clients, the intermediate application can use a method of interposition through a "metaprocess" managing virtual network addresses, and implementing a migration of clients' connections from the master application to these restart applications. The intermediate application can also use a method of interposition through a "metaprocess" managing virtual process identifications (virtual PID), allowing the communications for these restart or clone processes to be restored identically to those of their original processes.

These techniques can, for example, be those described in patent FR 2 843 210.

A restoration followed by a partial or total switching can also be implemented besides any fault, for example to distribute the workload of the master application or allow maintenance of certain elements of the operational node or network.

In order that this failure and/or switching are as transparent as possible from the point of view of the clients, the intermediate application records all or part of the events affecting the master application several checkpoints, and backs them up in the form of one or several "logs".

On completion of a restoration from a checkpoint state, the restart application is in the state of the master application when establishing said checkpoint. Starting from this state, the intermediate application uses the logs that were backed-up since said checkpoint, to cause the re-execution or replay, by the restart application, of the events which have taken place in the master application since this checkpoint. This re-execution, or replay, is implemented so that the restart application reaches the state where the master application was after the last backed-up event, for example, to a state immediately preceding a failure.

The intermediate application can also implement a virtualization of some resources as regards the restart application, for example when these resources have changed since the restored checkpoint, in order to allow it to run its re-execution without interfering with the actual state of these resources, as long as it has not returned to a state corresponding to said actual state.

Among the events to be logged on the operational node and to be replayed on the secondary node, there is a distinction between events termed external and events termed internal.

External events are defined as outside the application in question, in the occurrence the master application. Therefore, external events are defined as those which are initiated in the application by actions or information coming from outside this application, i.e. in particular coming from hardware or software elements which it does not control. These external events can take the form of data or signal inputs, for example hardware interface inputs, such as keyboard or mouse, or data arriving via the network and coming from the outside world, such as a client in the case of a client-server application. Most frequently, these external events cannot be deduced or recreated from the environment of the application. These external events are logged by the master application and can be replayed by the restart application.

If the application in question, sometimes termed the target application, incorporates elements executed on a node other than the primary node, the events in said application but outside the primary node can also be processed as external events.

Internal events are defined as internal to the master application or to the node which is executing it, for example in the form of data or signal inputs received by a process of this application and coming from another process which is also part of the application. These internal events can be received directly or through software mechanisms or agents outside the application but part of the node executing it, for example through partner applications or part of the operating system, such as the "Inter Process Communication" (IPC) agent from a system of the Unix type. These internal events can comprise "message passing events", for example coming from "pipes", "signal queues" or "message queues", or interfaces of the "socket" type. These internal events can also comprise "shared memory access" events, for example semaphores or "mutex".

While an application is running, internal events are particularly numerous, for example compared with external events. Moreover, internal events correspond to rapid execution, or low latency, operations, in particular compared with the time for a logging operation, above all when the latter includes a network transmission or storage on a permanent medium such as a hard disk. For example, a logging operation can represent a duration 10 to 10,000 times greater than that of an internal event.

Figure 2:
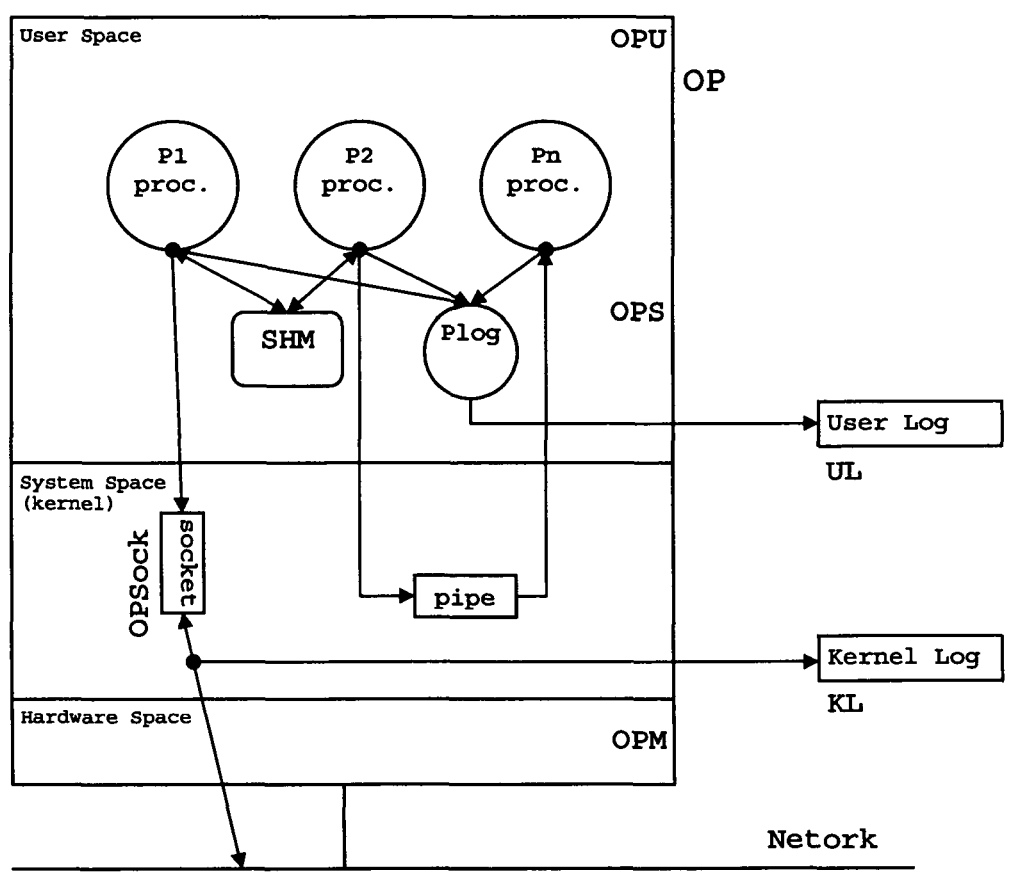
FIG. 2 is a symbolic diagram summarizing the organisation for logging the events on an operational node.

As illustrated in FIG. 2, the logging JOP of events that have occurred since a checkpoint is implemented differently for external and internal events, and backed up separately.

An operational node OP, connected to the cluster by a network, comprises a hardware space, supporting a system space, which itself supports a space termed "user space". The hardware space, which can be defined by reference to one or more of the lowest layers of the OSI model, comprises in particular hardware devices for executing the process, actual memory and processors and communication, such as network cards. Typically, many external events transit via the hardware space, in the form of communications passing via the network.

The system space, which can be defined by reference to one or more of the intermediate layers of the OSI model, includes, in particular, the operating system. This system space comprises various software mechanisms and agents managing communications from applications with the outside world via the hardware space, for example in the form of sockets in a Unix system, or managing communications between several application processes, for example in the form of a "pipe" and IPC in a Unix system.

The user space, which can be defined by reference to one or more of the topmost layers of the OSI model, comprises processes which are part of the various applications executed by the node, such as the master and intermediate applications. Several processes P1, P2, and Pn, which are part of one or more applications, for example the master application, are executed in this user space. These processes exchange information with the outside through one or more "sockets" from the system space, and between themselves through one or more "pipes" from the system space. Some of these processes also concurrently access "shared memory" resources SHM, in a way managed by state resources (not represented),.

When setting up a checkpoint, the intermediate application can start up one or more new logs, or record a "checkpoint mark" in the running log(s).

It should be noted that the term "user", in particular in the case of the "user space" or the internal events log ("user log") (described later), is here to be taken to mean "system space user". This means that the user space is accessible to applications using the node and its operating system, even if this user space is not directly accessible to persons or computers communicating with these applications, and which will then be defined as "clients".

External events are backed up in a log, made of one or more files KL, termed "kernel log" (c.f. FIG. 2). To implement this backup, the data representing these events is read, after its arrival in the node, at a low level of the layers of the OSI international classification. Preferably, these events are read in the system space, for example in the kernel, before being demultiplexed and before being processed by the "protocol stack". As this logging is made directly from inside the system space, it is possible to avoid the losses of performance caused by writing to a buffer and unnecessary context changes.

Figure 3:
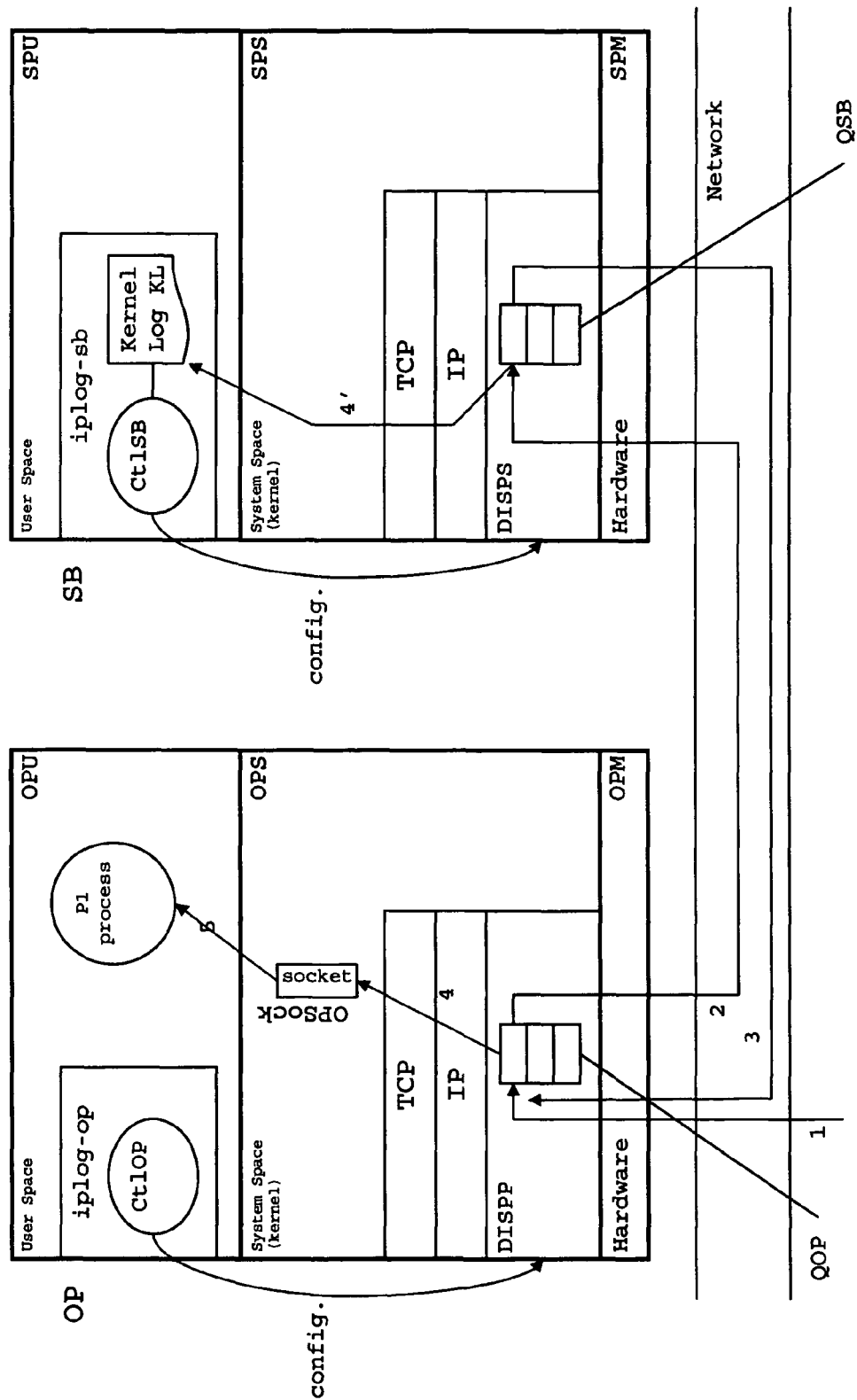
FIG. 3 is a symbolic diagram illustrating the operation of the logging of external events from an operational node and its backup on a secondary node.

FIG. 3 illustrates in more detail the operation of logging external events, in particular when they take the form of TCP-IP protocol messages. The master application is executed on the operational node OP and comprises at least one process P1. The intermediate application comprises first an "IplogOP" module, comprising a control process CtlOP, which is executed on the operational node OP, and second an "IPlogSB" module, comprising a control process CtlSB, which is executed on a secondary node SB. On each of these nodes OP and SB, the control process configures and manages the operation of a software mechanism or agent "disp" (DISPP, DISPS), which is executed in the system space of the node in question.

In the case of a system of the Unix type, said "disp" agent comprises in particular a kernel module, loaded into the system space. This kernel module is loaded dynamically into the kernel when the system is booted, or even before launching the application to be managed or made reliable. From the point of view of the functional structure, for example with reference to the OSI layers, this module is inserted under the IP layer, in particular between the IP layer and the "network device" layer depending on hardware space.

This "disp" agent may intercept and store messages, received from the network and addressed to the TCP layer, in message files QOP and QSB, operating by sending or receiving as required.

In step 1, a message coming from a client, addressed to the process P1, is received by the "disp" agent in the system space of the operational node OP, which retains it in a message queue QOP.

In step 2, a logging message, representing the message received, is sent by the "DISPP" agent from the primary node to a secondary node SB, where a DISPS agent receives it in a received message queue QSB.

The operational node OP may in particular communicate with one or more secondary nodes SB over a separate local area network (LAN), by using a network device different from that used to communicate with clients.

Several of these secondary nodes can also subscribe to an address of the "multicast" type according to the RFC 1112 standard, for communicating with the operational node OP. The use of a multicast address, for example defined by the RFC 1112 standard "Host Extensions for IP Multicasting") as an IP address in the range situated between 224.0.0.0 and 239.255.255.255, thus allows the operational node to send only once messages addressed simultaneously to a number of secondary nodes, without overloading the network with a transmission which would be sent to all the addresses in the network.

Preferably, the logging message sent from an node OP to another node SB should contain all of the packet or packets received at the physical layer level, in their original form. That is to say, it contains all the data addressed to the master application, as well as network data such as Ethernet, IP, and TCP headers.

In step 3, the secondary node SB sends an acknowledgment message to the operational node OP.

In step 4, on the operational node OP and once the corresponding acknowledgment has been received, the message is retrieved from the message queue QOP and sent to the TCP layer.

In a parallel step 4', the secondary node SB records the message in a log, for example the kernel external events log KL, and takes it out of the received message queue QSB.

In step 5, in the operational node OP, the P1 process of the master application reads the message in the "socket" element and then processes it for carrying on with its operating.

As the master application only considers the incoming message after acknowledgment by the secondary node SB, the invention ensures that an unlogged message cannot be processed by the application. For example, such an unread message can therefore be retrieved by the TCP protocol's retransmission functions.

If a checkpoint mark is to be set in the kernel log, the control process CtlSB in the secondary node records there the data representing said checkpoint mark.

The content of an internal event depends directly on the local environment, i.e. within the node, on the content of the preceding external events, and on questions of scheduling within a processor or managing a number of processors or computers working in parallel within a node. De facto, in most cases, only the order of these events influences the subsequent behaviour of the application.

The intermediate application INT is confined to logging the order of these internal events, without memorising the detail, or the parameters, of each of them. This choice thus allows the volume of data to be stored for the logging JOP of these internal events to be reduced, and thus to minimise the loss of performance occasioned in the operational node and the master application by this logging.

Internal events are backed up in a log, made of one or more files, termed "user log" (see FIG. 2).

Figure 4:
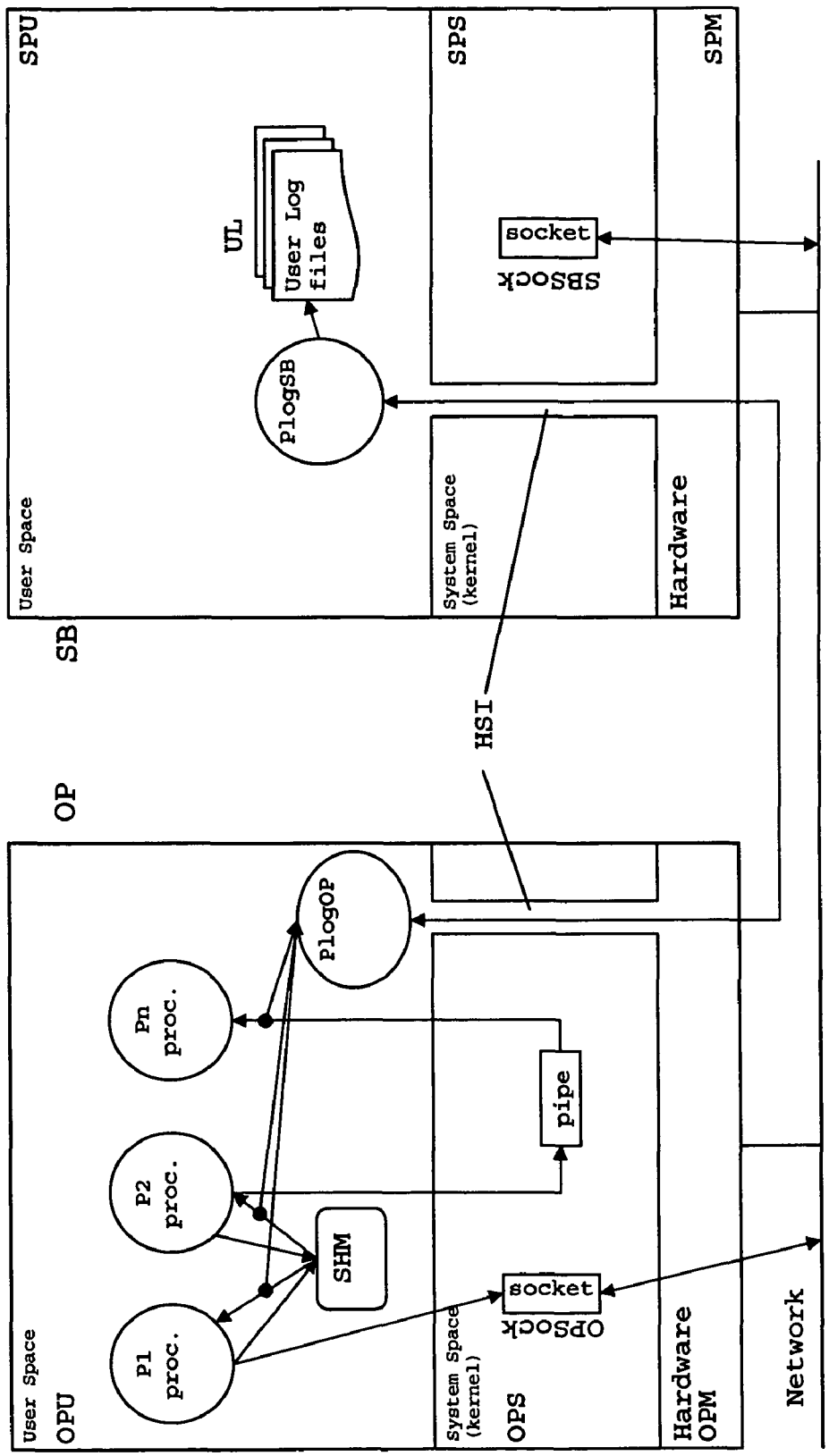
FIG. 4 is a symbolic diagram illustrating the operation of the logging of internal events from an operational node and its backup on a secondary node.

As illustrated in FIG. 4, the primary nodes OP and secondary nodes SB communicate via a hardware and/or software high speed interconnection (HSI). Said HSI system allows data transfers between the primary node's OP logging process PlogOP and a secondary node's SB logging process PlogSB, and this directly by bypassing all or part of the operating systems of these two nodes. Such an HSI system can be implemented following known means, by using existing network interface controllers, such as network cards and their control software. Such an HSI system may also be implemented by using high performance network devices, in parallel or in combination with the rest of the network internal to the cluster.

Internal events are scrutinized and read in the operational node's OP user space by a logging process PlogOP of the intermediate application. This then sends to the secondary node's logging process PlogSB, via the high speed connection system HSI, the data representing these internal events and/or their order of occurrence. This data is then backed up in one or more files forming the "User log".

If a checkpoint mark is to be set in the "user log", the secondary node's control process PlogSB records there the data representing this checkpoint mark.

Preferably, the logging process PlogOP reads the internal events on their "return", i.e. when its results have already been produced but not yet sent to the master application process which requested its execution.

This reading is done, for example, by intercepting Input/Output system calls, for example an access to a "pipe", and the responses to operations locking shared memory segments SHM.

Figure 7:
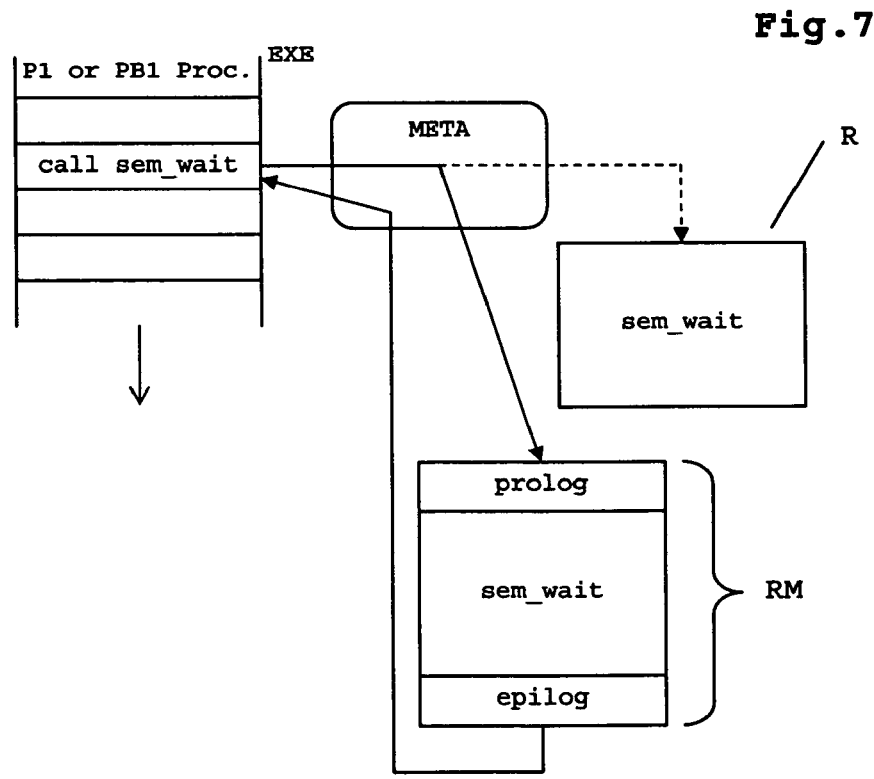
FIG. 7 is a symbolic diagram of the use of an interposition technique, during a call to a system routine, to insert supplementary instructions into the execution of said routine.

This interception may be implemented by inserting recording instructions ("recording probes") in the content of all or part of the routines provided by the system and called by the application. These recording probes are added in the form of additional instructions, forming for example an epilogue to the end of the original routine code as illustrated in FIG. 7, by using a dynamic interposition technique by "metaprocess", as specified later.

The internal events log, the "user log", thus comprises a succession of records each representing an internal event. These events can be logged in a single file, and will then comprise an identification of the resources and/or processes in question. They can also be recorded in several files, for example one file per resource, or per process, or per combination of the two.

For a file corresponding to a given resource, each of these records comprises, in particular, the following fields:
   a sequence number for the event in question, in a sequence specific to each resource, and which is incremented at each new event or operation on said resource;
   a timestamp information, representing for example the elapsed time since the last event concerning this resource;
   a type of event, for example "read" or "write" for an input/output resource ("I/O"), or "lock" or "unlock" for a semaphore;
   a result, i.e. a value in case of an input/output operation or an identification of a process obtaining exclusive access in case of a "lock".

This result will in particular be used to implement a resources virtualization, for example during the replay of the events in a log by a restart or backup application restored in a secondary node. The stored result will then constitute a value to be forced as the result of an I/O operation request made during the replay, or a virtual identification of a process (virtual PID) in case of a task obtaining a "lock".

In order to limit losses in performance due to sending logging data from the operational node to one or more secondary nodes, it is useful to aggregate the sending of data representing several internal events.

For this, the intermediate application may use a combination of several different methods, for example implemented by the logging process PlogOP, termed primary, of the operational node OP.

It is understood that the internal change of an application is unimportant as regards to the outside world, for example concerning its clients, as long as this operation does not send anything to the outside world. A restart application, restored from a checkpoint and a log, will not cause any interruption of its services to the outside world if said log does not include internal events which have occurred since the last external message sent by the logged master application.

According to a first way, this primary logging process PlogOP sends internal logging data as it occurs, but in asynchronous mode and according to the transmission availability, without blocking the master application functioning, as long as the latter does not send external messages. On the next sending by the master application of an external message, means of detection warn the primary logging process of this, which then blocks or suspends the sending of this external message, and possibly the execution of one or more of the master application's processes. This blockage is then maintained until all the internal logging data has been sent through this asynchronous transmission, or until it has received a receipt for said data.

According to a second way, the primary logging process PlogOP stores in a buffer or "cache" the internal logging data representing several successive internal events, without sending these immediately to the secondary node's logging process PlogSB. It sends these only when their number reaches a set threshold, or when the application must send a message, termed external, to the outside world, for example data or a signal addressed to a client or to an external process. During the next sending by the master application of an external message, means of detection warn the primary logging process of this, which then blocks or suspends the sending of this external message, and possibly the execution of one or more of the master application's processes. This blockage is then maintained until the primary logging process has sent to the secondary node the remaining logging data in the cache, or until it has received a receipt for this data.

In these two ways, the fact of having to send an external message constitutes an outgoing event, which constitutes a type of event that can be termed blocking, i.e. which requires the logging of preceding events to be closed before execution of this event. According to the embodiments, other types of event can be chosen as blocking, most frequently in addition to external outgoing events.

Figure 4A:
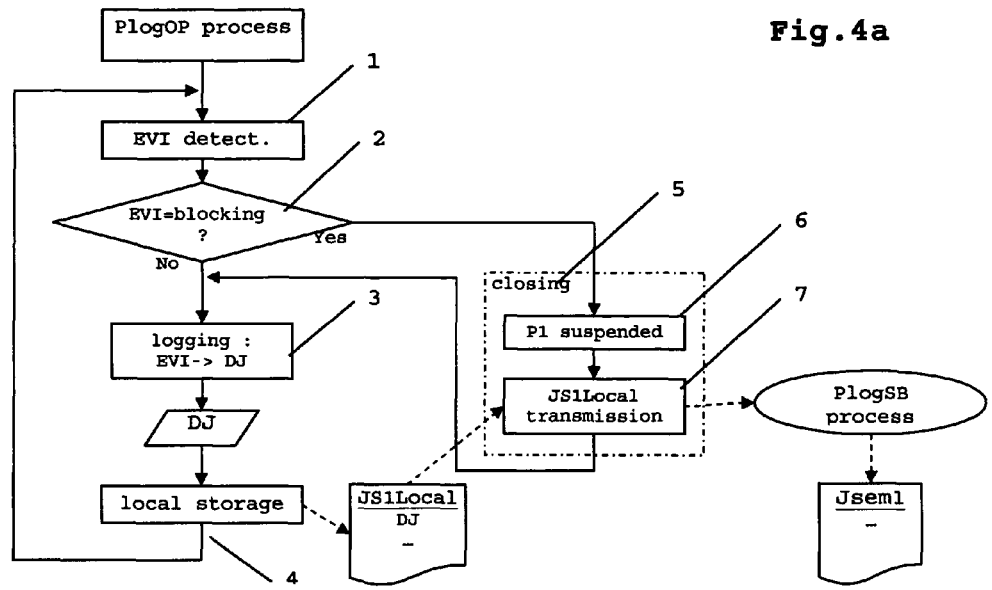
FIGS. 4a and 4b illustrate two versions of the operation of a mechanism for the aggregated transmission of logging data from a sequence of internal events.

FIG. 4a illustrates the operation of an events log with aggregation of the logging data DJ for a number of internal events EVI before transmission outside the primary node OP.

In a step 1, the logging process PlogOP detects, during the running of a logged process P1, the occurrence of an event EVI.

In a step 2, the logging process PlogOP checks whether the detected event EVI is of a type that must be considered as blocking.

In a step 3, if the event EVI is not of a blocking type, the logging of this event produces a logging data item DJ.

In a step 4, this logging data item DJ is stored in primary node OP in an ordered structure constituting a buffer log JS1Local, before waiting for the detection of the next event.

In a phase 5, if the detected event EVI is of the blocking type, the logging process PlogOP implements a phase closing the running sequence of internal events previously logged in the buffer log JS1Local.

This phase 5 includes a step 6, where the execution of the logged process P1 is suspended pending satisfactory execution of the closure phase 5.

This phase 5 also comprises a step 7, where the primary node's logging process PlogOP sends the contents of the buffer log JS1Local to the secondary node's logging process PlogSB, which stores it in the log JSem1 concerning the detected event EVI, followed by the preceding data. The primary logging process PlogOP then continues the direct logging of the detected event EVI, with restarting a buffer sequence if this event is also an internal event.

Figure 4B:
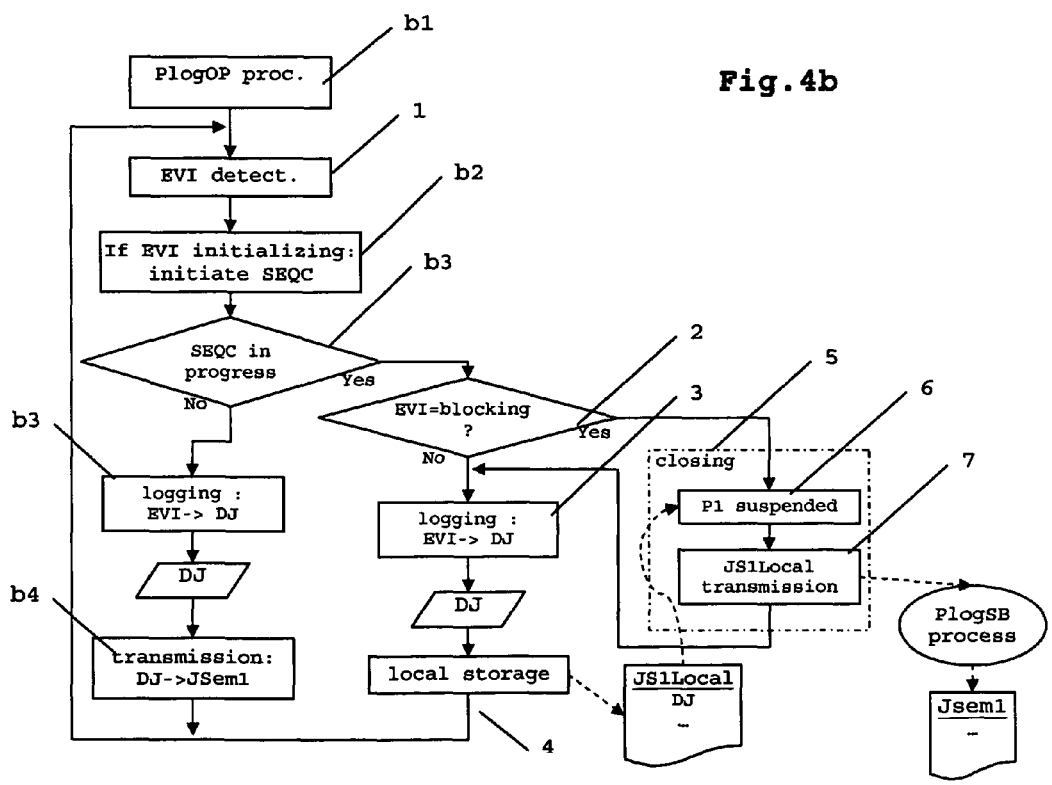

In a variant illustrated in FIG. 4b, the buffering of internal events can be initiated by types of event possibly different from events of the blocking type. This then involves events of the initiating type. A single type of event can be chosen as being a blocking-only type or an initiating-only type, or both.

In this variant, the step 1 of detecting an event is followed by a step b1. In this step b1, if the detected event EVI is of a type considered as initiating, the primary logging process PlogOP checks whether a current sequence SEQC for logging in buffer memory is in progress, and initializes one if this is not the case.

In a subsequent step b2, it tests whether such a current sequence SEQC for logging in buffer memory is in progress for the detected event EVI.

In a step b3, if no current buffer sequence SEQC is active for this EVI event, its result is logged as a logging data item DJ.

In a step b4, said logging data item DJ is sent to the secondary logging process PlogSB, which stores it following those preceding in the log file JSem1 concerning the detected EVI event, following the preceding data. The primary logging process PlogOP then waits for the detection of a new event.

Following step b2, if a current sequence is active for the detected event EVI, the logging of this event continues as in FIG. 4a.

When the intermediate application wants to switch all or some of the services from the master application to a restart application, it begins by restoring this restart application in a secondary node out of a checkpoint state, and then implements a replay of the events logged since this latter checkpoint.

In particular, for a master application which is event driven, i.e. on initiating events (external), for example a transactional application, the the restoration replay is implemented differently for external and internal events.

Such an functioning means, for the application, that it comprises at least one process which can remain to wait to receive an external event, and at this point react by implementing operations comprising internal events The replay thus comprises an active supply to the application of logged external events, and a passive response providing logged answers in response to internal events, which are created by restart application itself during the replay.

FIG. 5 illustrates the operation of the replay RSB of external events of the TCP message type, logged in one or more files KL constituting the external or "kernel log".

Said kernel log KL is used by a replay process PRE, belonging to the intermediate application and being executed in the user space of the secondary node SB, for re-injecting previously logged TCP messages into a process PB1 of the restart application.

To implement this re-injection, the intermediate application INT comprises or uses a software mechanism or agent which is interposed in the TCP message receipt layers, for example in the form of a software mechanism or agent "ipfilter", comprising a functional kernel module between the IP and TCP layers. The secondary node also includes a local loop function for the BL network, the access to which is "mapped" by an interface into the system, in order to be accessible to the user space processes. This loop BL can include, in particular, a physical device within the hardware space, which allows it to re-inject the data at the bottom of the IP layer, as opposed to virtual loop-back interfaces which are software implemented in an operating system, for example Unix.

In a step 1, the replay process PRE reads a message logged in the files of the "kernel log" KL.

In a step 2, the replay process PRE injects this message into the of the network local loop BL.

In a step 3, this message is received by the IP layer, which sends it, via the intermediary of the "ipfilter" agent, to the TCP layer for processing.

In a step 4, if the TCP layer sends a receipt to the network, the latter will be filtered or blocked by the "ipfilter" agent.

In a step 5, after having sent the message to the TCP layer, after having received its receipt if any, the "ipfilter" agent signals to the replay process PRE that the message has indeed been received or processed by the TCP layer.

In a step 6, the restart application process PB1 receives the message from the TCP layer, and implements asynchronous reading of the packet(s) contained in it.

Throughout the replay, the "ipfilter" agent isolates the restart application from the network, at the same time preventing all external messages from arriving up to the TCP layer and, at the same time, preventing all messages sent by the restart application from arriving at the IP layer, transparently as regards to this application.

Within the replay application, to implement the replay of internal events occuring between two replayed external events, the intermediate application allows the restart application to run by itself, at the same time virtualizing for it the concerned resources, thus implementing a passive replay. A replay process PRI then detects each operation constituting an internal event as regards to a given resource, and thus forces said resource to adopt the behaviour which has been logged, hence sending to the replay application the result stored for said event during this logging.

Figure 6:
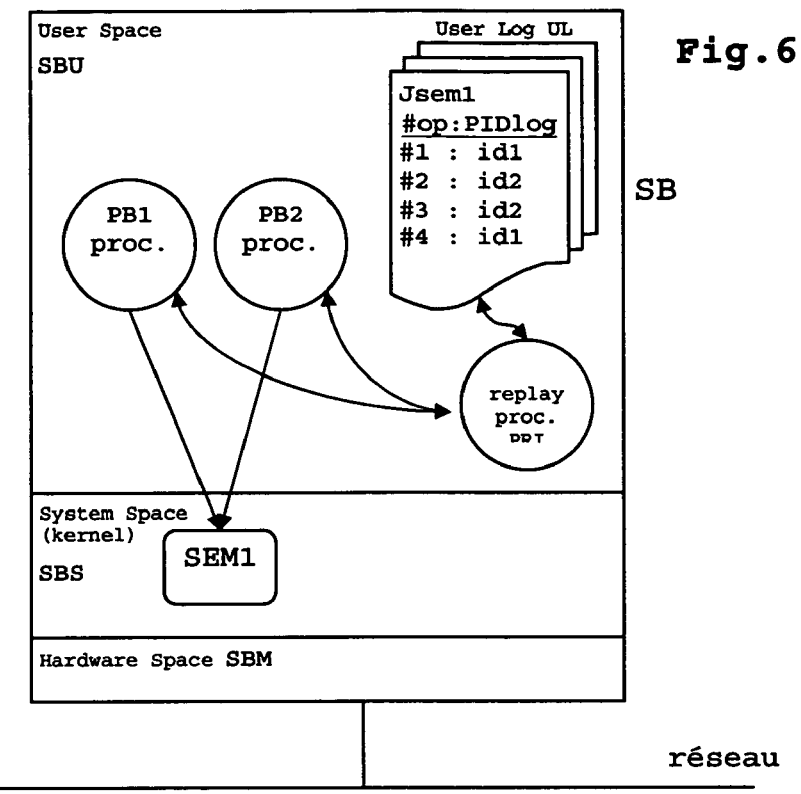
FIG. 6 is a symbolic diagram illustrating the replay functioning of internal events while updating a restart application on a secondary node.
Figure 8:
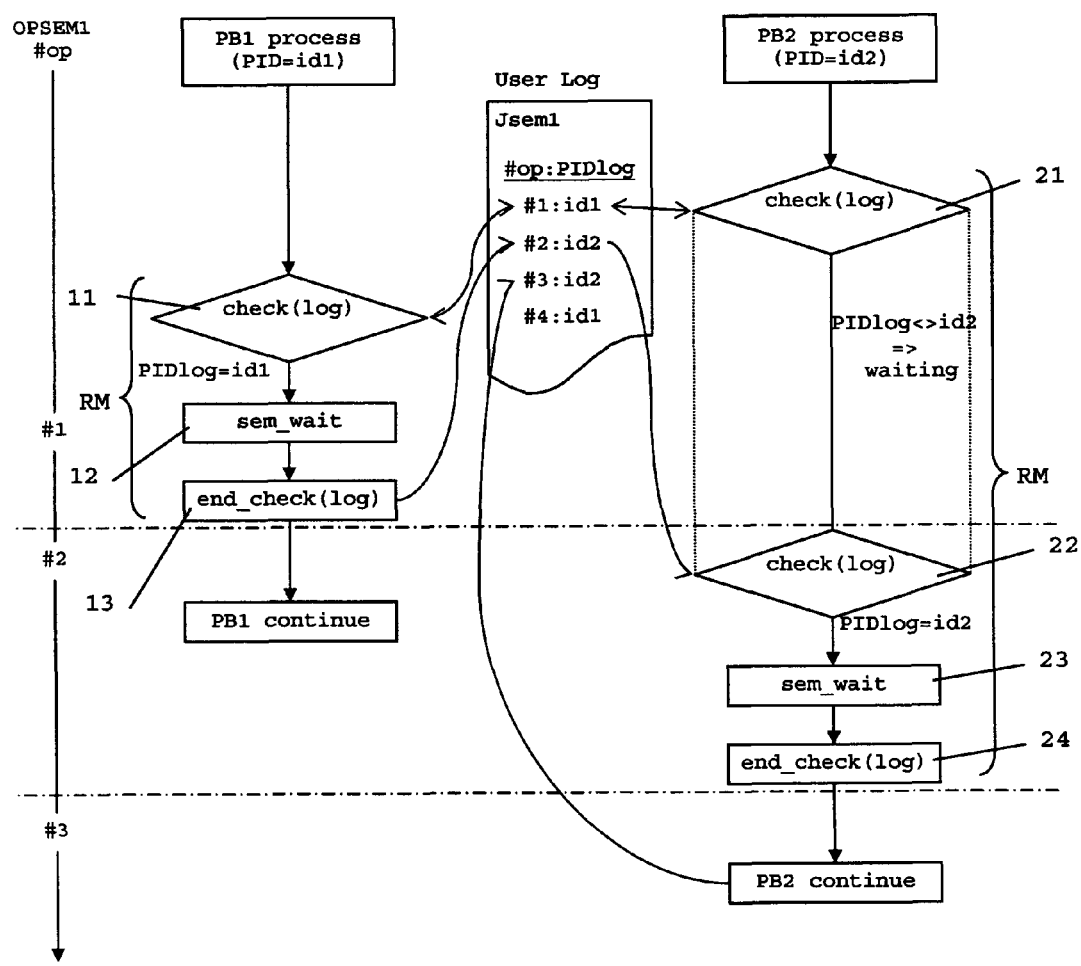
FIG. 8 is a time diagram illustrating the progress of an internal event replay for two concurrent processes, using an addition of supplementary instructions in a system routine to obtain the same progress as during logging.

FIGS. 6 to 8 illustrate a replay RSB example of an internal event, in a case where it comprises, from two processes PB1 and PB2 of the restart application, an operation of requesting a semaphore SEM1 so as to obtain mutual exclusion access to a shared resource, for example a shared memory area.

During a restoration on a secondary node SB, these two processes PB1, PB2 are implementing a replay based on files constituting a user log. During their replay, the execution of the restart application causes each of these processes to place a call to a single semaphore SEM1, to which corresponds a log file JSEM1 included in the internal events log—the "user log".

The detection of these access operations and presetting their response are implemented by adding additional instructions in the content of all or part of the routines provided by the systems and called up by the application, using a technique of dynamic interposition by "metaprocess". Such a technique can be, for example, that described in patent FR 2 843 809. In particular, these instructions can be aggregated before the code implementing the functions from the original routine and thus form a prologue, or be aggregated after this code and form an epilogue.

FIG. 7 thus illustrates the insertion of a prologue and an epilogue within a routine R, thus giving an amended routine RM. In this example, it should be noted that the same amended routine RM can be used to implement a logging of a master application and also to implement a replay of a restart application.

During execution of the application's executable files, a process P executes a line of code calling up the routine R, for example the routine "sem_wait" from the "POSIX.4" standard, which requests the positioning of a given semaphore for gaining an mutual exclusion access to a given area in shared memory. In the case of a multi-thread application, this may involve an instruction—"pthread_mutex_lock" from the "POSIX threads" standard—which fulfils a similar role.

An interposition agent META, loaded into the system when it is booted or before the application's executable files, intercepts the call to the system's original routine R, and forwards it to the amended routine RM. This amended routine comprises instructions implementing or calling up the original routine R—"sem_wait" —preceded by instructions implementing a prologue and followed by instructions implementing an epilogue.

These supplementary instructions can comprise, in particular, an algorithm from the following types:
For the prologue:
if (replay) check(Jsem1)
For the epilogue:
if (replay) end_check(Jsem1)
else record(result, Jsem1)

The instructions "if(replay)" test a condition indicating whether the application is in the process of implementing a replay or not.

In the opposite case ("else"), this means that the application is being executed normally and must therefore be treated as a master application. The epilogue then executes a function—"record(result, Jsem1)" —which is a recording probe as cited previously and participates in the logging of an internal event, at the same time storing the result—"result" —in the log—"Jsem1".

When the "sem_wait" routine is called up by the restart application during a replay using the "Jsem1" log, the prologue is executed before implementing the system's original "sem_wait" routine.

FIG. 8 represents a time flowchart which illustrates the operation of this amended routine RM to implement the replay of the two processes PB1, PB2 from the JSEM1 log included in the internal event log—"User Log". Each event logged in the JSEM1 log is numbered according to an incremental sequence #OP specific to the semaphore SEM1 in question. Associated to each of these numbers #op, the JSEM1 log contains an identification (PID) of the process which has called up the semaphore corresponding to said JSEM1 log during the logging.

As the two processes PB1 and PB2 are executed in parallel, their respective calls to the SEM1 semaphore using the "sem_wait" function are not necessarily made in the order stored in the semaphore's log JSEM1.

When the "id2" identifier process PB2 calls up the SEM1 semaphore during the replay, the prologue then executes the instruction "check(Jsem1)" in the name of said same process PB2, in a step 21. This function—"check(Jsem1)" —reads in the JSEM1 log the line corresponding to the current value of the sequence number OPSEM1, that is line "#1: id1".

This "check" function compares the value PIDlog read, or "id1", with the identifier of the calling PB2 process, or "id2". If it notes that these values differ, this "check" function suspends execution of the calling PB2 process, for example by re-executing this same step 21 of comparing in a continuous loop.

Subsequently, when the PB1 process identifier "id1" also calls up the SEM1 semaphore during the replay, the prologue also executes the "check(Jsem1)" instruction, but this time in the name of the new PB1 calling process, in a step 11. If it notes that said PB1 calling process is indeed the one which identifier "id1" is stored in the log at the line corresponding to the current number in the active sequence, i.e. the value "#1", the "check" function authorises the continued execution of the PB1 calling process.

In a step 12, the amended routine RM then implements the functions of the original routine R, i.e. the "sem_wait" instruction, which then assigns to it the SEM1 semaphore and returns the value "id1" of the PB1 calling process.

In a step 13, the epilogue then executes the "end_check (Jsem1)" instruction in the name of the PB1 calling process. Said "end_check" function then closes the PB1 process' "sem_wait" call and unblocks the execution of the PB2 process which has been on hold. This operation can comprise specifically an incrementing of the sequence number OPSEM1 of this SEM1 semaphore, making it move to the next value "#2".

In this case, when the "check" function called up by the PB2 process is executed again in a step 22, it reads the next line of the JSEM1 log "#2: id2" and lets its PB2 calling process continue its execution of the amended routine RM.

In a step 23, the amended routine RM then implements the functions of the original routine R, or the "sem_wait" instruction, which then assigns to it the SEM1 semaphore and returns the value "id2" of the PB2 calling process.

In a step 24, the epilogue then executes the "end_check (Jsem1)" instruction in the name of the PB2 calling process, again incrementing the SEM1 semaphore sequence and making it available to continue the replay.

Regardless of the order in which the various replayed processes request assignment of the SEM1 semaphore, it is clear that they can only be obtained in the exact order stored in its JSEM1 log, and therefore in the same order as during the running of the master application which generated this logging.

As these additional instructions are added by a META agent outside the master application and added to the operating system without any change to the latter, it is clear that these logging and replay operations are implemented transparently and non-intrusively, for the master application and without changing pre-existing elements of the system.

Given the large number of internal events, it is useful to optimize the function of their logging and/or replay, in particular to avoid any degradation of performance which would largely detract from the benefits obtained from the aforementioned characteristics.

Among the types of internal event which occur between two external events, most can be classified as deterministic, i.e. incorporating only operations whose results depend exactly on the state of the application before these operations.

On the other hand, in particular during multi-task operations or those distributed over several nodes, some internal events are of a non-deterministic type, as they comprise operations which can provide a result dependent on factors outside the application or the primary node.

By logging or replaying only internal events of non-deterministic types, it is therefore possible to limit overload of the operational node, and thus degraded performance caused by the use of the intermediate application to make reliable or manage the master application.

As illustrated in 8*a* and 8*b*, the logging and replay can be accelerated, in particular by only logging the result and only presetting results at replay for internal events where the behaviour is not deterministic.

For all events, and in particular internal events (EVI), a META interposition mechanism (FIG. 7), as described previously, calls up an amended routine RM implementing the operation stipulated instead of the original routine R. This amended routine RM comprises a functionality capable of initiating or notifying a logging process PlogOP or a replay process PRI from the occurrence of this event EVI, and if necessary wait for its agreement to continue the processing of this event or to hand it over to the P1 or PB1 process which has called it up.

Whether this involves logging or replay, managing this event EVI then comprises a reactive step to the occurrence of this event, followed by an additional management step GC (FIGS. 8*a*, 8*b*) whose content depends on the deterministic or non-deterministic nature of this internal event.

Figure 8A:
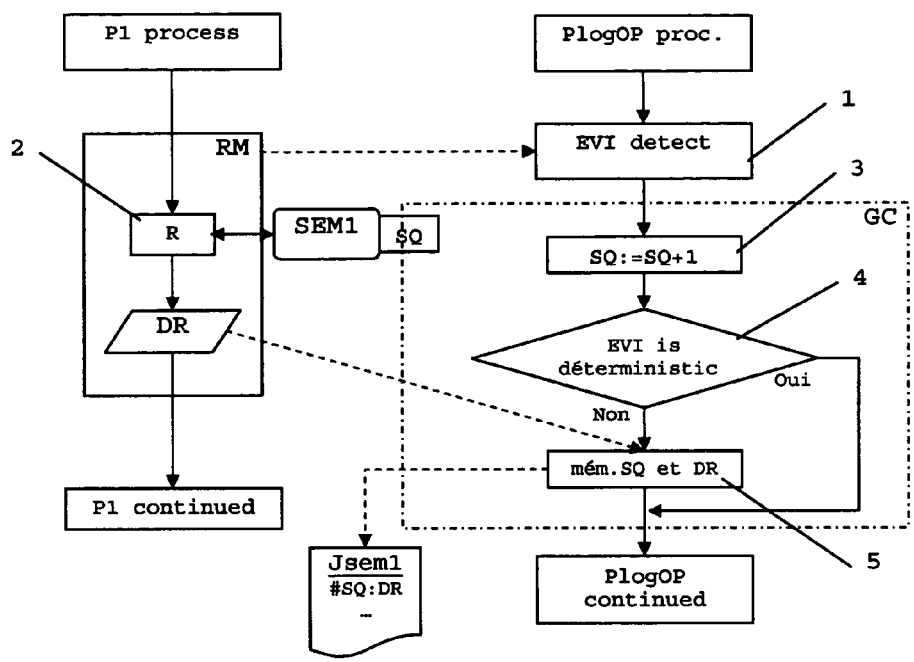
FIGS. 8a and 8b illustrate the operation of logging and replaying internal events so as to process only non-deterministic events.

FIG. 8*a* illustrates the operation of logging an internal event. While the P1 process is executed through a logged (JOP FIG. 1) run, executing an instruction implements an internal event EVI applying to a shared resource, such as a SEM1 semaphore.

In a step 1, the amended routine RM corresponding to the event to be logged EVI notifies or initiates the logging process PlogOP, which thus detects the occurrence of this event EVI.

In a step 2, the amended routine RM corresponding to the event EVI implements on the SEM1 semaphore the operation stipulated in the original routine R and receives or calculates a result datum DR addressed to the logged process P1.

In a step 3, the logging process PlogOP increments a sequence number SQ, for example assigned to the SEM1 semaphore, corresponding to the position of the detected event EVI in a P1 logging sequence.

In a step 4, said process PlogOP carries out a test to establish whether the internal event EVI detected is deterministic or not. This test can apply, for example, to a parameter received from the amended routine RM during its call, or to the presence of a result datum DR sent with this call, or to an instruction or event identification previously stored in the primary OP node.

In a step 5, if the detected event EVI is non-deterministic, the PlogOP process sends the result datum DR to the secondary node's PlogSB logging process. This stores the result datum DR and the sequence number SQ corresponding to the event EVI, such that they are associated in a log file JSem1 corresponding to the semaphore SEM1, following the result of preceding logged events. Depending on the logging conditions, data stored in the JSem1 log can also be stored directly in a log file on a permanent medium in the primary node by the PlogOP logging process.

On completion of a sequence of internal events for the logged process P1, the JSem1 log contains an ordered set of all the result data sent by the SEM1 semaphore to said P1 process, associated to the sequence numbers for the events which involve them.

Figure 8B:
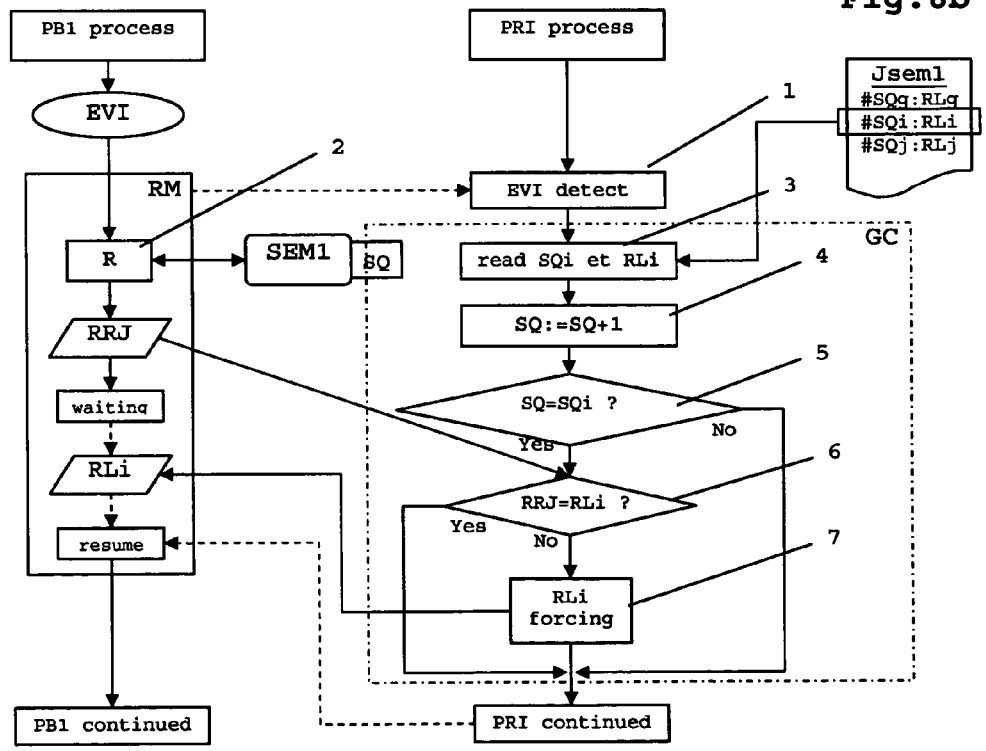

FIG. 8*b* illustrates the replay operation for this internal event EVI, in a restart process PB1, during a passive replay phase RSB (FIG. 1), controlled by a replay process PRI (see FIG. 6), of the events stored in the JSem1 log and corresponding to the SEM1 semaphore. While the PB1 process is running and during the replay of events from the JSem1 log, executing an instruction implements an internal event EVI of a non-deterministic type applying to the SEM1 semaphore.

In a step 1, the amended routine RM corresponding to the event to be logged EVI notifies or initiates the replay process PRI, which thus detects and identifies the occurrence of this event.

In a step 2, the amended routine RM corresponding to the event EVI implements on the SEM1 semaphore the operation stipulated in the original routine R and receives or calculates a result datum corresponding to the actual replay result RRJ. The amended routine RM then suspends execution of the restart process PB1 and waits for a signal from replay process PRI to send this result RRJ to the restart process PB1.

In a step 3, the replay process PRI reads in the JSem1 log the next unused value RLi for the replay, with the sequence number SQi which is associated to it.

In a step 4, the process for incrementing a sequence number SQ, for example assigned to the SEM1 semaphore, corresponding to the position of the detected event EVI in a PB1 replay sequence PB1.

In a step 5, the replay process PRI carries out a test on the current sequence number SQ and the read sequence number SQi in the log, to establish whether the ongoing replay event EVI corresponds to a logged event.

In a presetting step 7, if these events correspond, the replay process PRI sends the read result RLi in the log to the amended routine RM, which stores it instead of the result RRJ from the original operation R. The amended routine RM then returns this result RLi to the restart process PB1 and lets it continue its execution.

Optionally, the presetting step 7 is preceded by a step 6, in which the replay process PRI receives from the amended routine RM the actual replay result RRJ and compares it with the read result RLi corresponding to the result of the same event during logging. If said two results RRJ and RLi correspond, the process releases directly the amended routine, which returns its result to the restart process PB1 and lets it continue its execution.

Hence it is clear that non-deterministic events can be recorded and replayed faithfully and exactly, ensuring for the restart process PB1 a replay run which will be faithful to that of the target process P1 during logging.

As only certain events are logged or replayed, and because supplementary internal operations to implement the invention are much faster then a storage or transmission for logging, overhead due to the operation of the intermediate application INT is reduced.

Optionally, when an original routine R is envisaged only to record events which are deterministic, an amended routine RM which corresponds to it may omit to provide any call to a logging or replay process. Likewise, when an original routine R is envisaged only to implement non-deterministic events, its amended routine RM can comprise a systematic call to a logging or replay process. During logging, step 4 (FIG. 8*a*) to test the deterministic nature can therefore be implicitly produced through the type of call received or even through the fact that a call is received.

In the case where a given type of internal event can be deterministic or not, depending on the type of application or the conditions of its execution, the amended routine RM can also include in its prologue and/or its epilogue instructions evaluating this type of application or these conditions of execution.

The use of a sequence number SQ can also be optional. In this case, the logging process PlogOP (FIG. 8a) is confined to memorizing the result datum when the event EVI is of the non-deterministic type. For its part, the replay process PRI (FIG. 8b) is confined to reading the next logged result RLi, and considers that this is the result to be forced for the next event EVI detected as being non-deterministic.

Moreover, a heuristic, or predictive, method of optimization allows for not logging systematically all internal non-deterministic events. This method can be implemented alone or in combination with other methods of optimization.

Owing to the cost in terms of time for logging and replay operations, in particular as regards to operations internal to a node, it can indeed be useful to implement a certain number of additional internal operations if this allows the number of logging operations to be decreased.

This heuristic optimization technique comprises the implementation, by the intermediate application, of a heuristic compression operating by predicting results and applying over all or part of the internal events detected during the operation of the master application.

During logging in the operational node, this heuristic compression can for example be implemented by the internal logging process PlogOP.

Figure 8C:
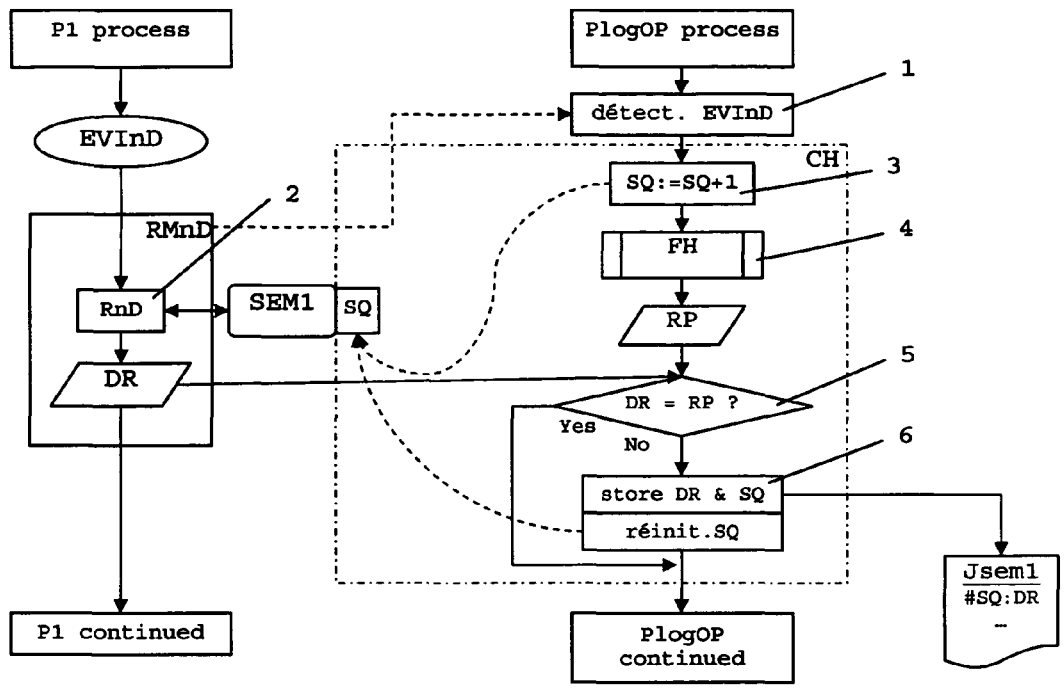
FIGS. 8c and 8d are diagrams illustrating the optimization of internal logging by heuristic compression and decompression respectively.

FIG. 8c illustrates the function of the logging of a non-deterministic event, with use of this heuristic compression CH.

While the P1 process is executed through a JOP logged run, executing an instruction implements an internal event EVInD of a non-deterministic type applying to a shared resource, such as a SEMi semaphore.

In a step 1, the amended routine RMnD corresponding to the event to be logged EVInD notifies or initiates the logging process PlogOP, which thus detects the occurrence of said event EVInD.

In a step 2, the amended routine RMnD corresponding to the event EVInD implements on the SEMI semaphore the operation envisaged in the original routine RnD and receives or calculates a result datum DR addressed to the logged process P1.

In a step 3, the process PlogOP increments the logging sequence number SQ corresponding to the SEMi resource involved with detecting the event EVInD.

Advantageously, said sequence number SQ is stored in working memory in the primary node OP. Therefore, its management represents a very low overhead compared with sending a result datum to a secondary node or compared with its storage in a log file on a permanent medium.

This incrementing of the sequence number SQ associated to the SEMi semaphore and its log JSEM1 thus allows the recording of the passing of a non-deterministic event EVInD correctly predicted by the prediction function FH, while avoiding the overhead which systematic storage of the result datum DR would represent In a step 4, the process PlogOP implements a software operation FH comprising a prediction of the result of this internal event EVInD in the form a predicted result RP. Preferably, this prediction is a deterministic software process made up of one or more deterministic functions based on the state of the logged process P1 or the master application before this event EVInD.

In a step 5, the process PlogOP compares the predicted result RP with the actual result DR output from the running RnD of the detected event EVInD.

In a step 6, if these two results DR and RP are different, the PlogOP process forwards the actual result DR and the corresponding value of the sequence number SQ, to the secondary node process PlogSB, which memorizes them by associating them as the next line in the log file Jsem1 corresponding to the resource SEMI in question.

During this step, it is possible to envisage a reinitialization of the sequence number SQ for logging the SEMi resource in question. In this case, the sequence number SQ represents the number of events correctly predicted since the last event whose result has been logged.

On completion of a sequence of internal events for the logged process P1, the JSem1 log contains an ordered set of all the result data sent by the SEM1 semaphore to said P1 process and which have not been predicted correctly by the prediction function FH.

In the case where the logging of internal events has been implemented by using such an heuristic optimization, the intermediate application then implements a heuristic decompression when replaying in a secondary node. This heuristic decompression uses a prediction identical to that used for compression and applies to the same events as during logging with heuristic compression.

Figure 8D:
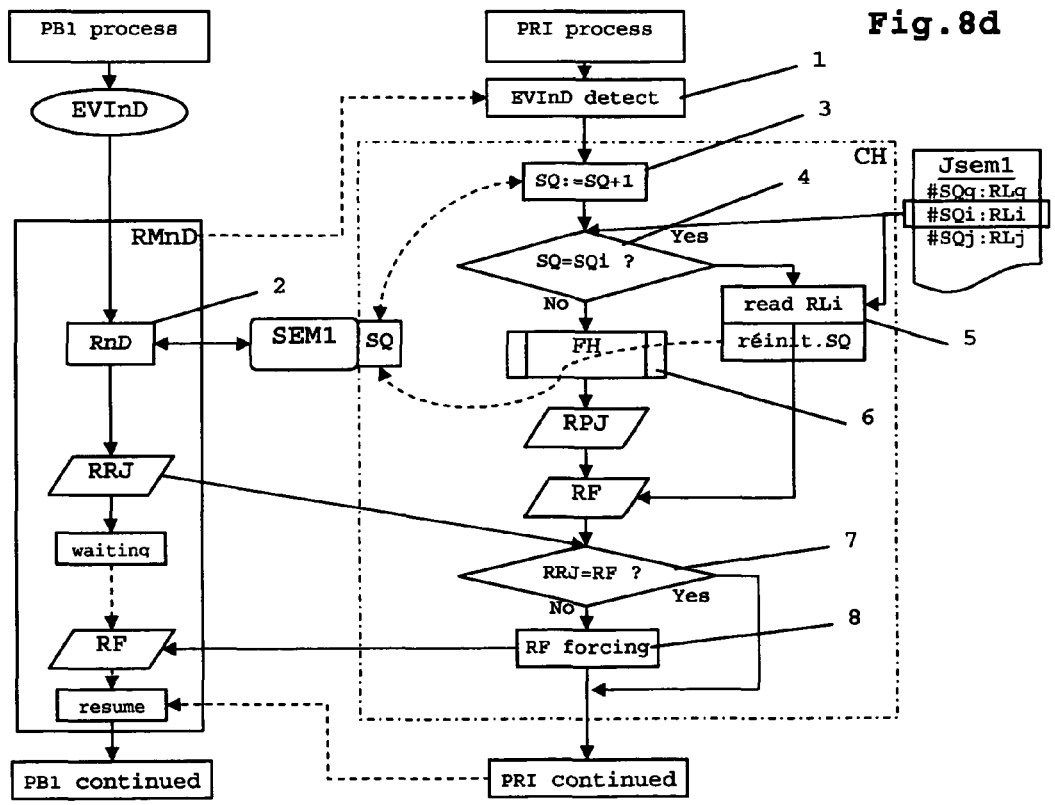

FIG. 8d therefore illustrates the replay operation for a non-deterministic event, with use of this heuristic decompression DH, in a passive replay of a restart process PB1, controlled by an internal replay process PRI (c.f. FIG. 6), based on the log JSem1 applying to the SEM1 semaphore.

During the replay of events from the JSem1 log, executing an instruction implements an internal event EVInD of a non-deterministic type applying to the SEMi semaphore.

In a step 1, the amended routine RMnD corresponding to the event EVInD to be replayed notifies or initiates the replay process PRI, which thus detects and identifies the occurrence of this event EVInD.

In a step 2, the amended routine RMnD corresponding to the event EVInD implements on the SEM1 semaphore the operation envisaged in the original routine RnD and receives or calculates a result datum corresponding to the actual replay result RRJ. The amended routine RMnD then suspends execution of the replay process PB1. It then waits for a signal from the replay process PRI to forward said result RRJ to the restart process P1 and to let it continue its execution.

In a step 3, the process PRI reads and increments the value of a sequence number SQ corresponding to the semaphore SEM1.

In a step 4, the internal replay process PRI compares this sequence number SQ with the next sequence number SQi not yet replayed from those stored in the log file Jsem1 corresponding to this same resource SEM1.

In a step 5, if these sequence numbers SQ and SQi correspond, then the internal replay process PRI reads the stored result RLi in this log for this sequence number SQi, and stores it as a forced result RF to be returned by the detected event EVInD. The internal replay process PRI then stores the fact that the event represented by the line SQi in the log JSem1 has been replayed, and activates the next line SQj of this same log for the processing of the next event detected.

During this step, it is possible to envisage a reinitialization of the sequence number SQ for replaying the SEM1 resource in question.

In a step 6, if these sequence numbers SQ and SQi do not correspond, the internal replay process PRI implements a software operation FH including the same result prediction as that produced during the logging of this internal event, in the form of a predicted result RPJ. The internal replay process PRI then stores the result RPJ of this prediction as a forced result RF to be returned by the detected event EVInD.

In a step 8, the internal replay process PRI forwards the forced result RF to the amended routine RMnD, which imposes it on the restart process PB1 instead of the actual replayed result RRJ returned by the internal event EVInD. The amended routine then lets the restart process PB1 continue its execution.

Optionally, this presetting can be preceded by a test step 7 to compare these two results RRJ and RF, and avoid acting in the restart process PB1 if these results correspond.

It should be noted that the identification of sequencing data SQ used in this method of predictive optimization can be made up of variables different from those described previously (FIGS. 8*a* and 8*b*), or be organized and processed jointly with these.

It is therefore clear that, even without logging the results of all non-deterministic events, the latter can be recorded and replayed faithfully and exactly. In this way, it is therefore possible to optimize these logging and replay operations, while ensuring a running of the replay run of the restart process PB1 d which is faithful to that of the target process P1 during logging.

Given the difference in speed between logging operations and simple calculating operations internal to a node, this heuristic optimization technique can be useful even if the prediction function used does not have a very high success rate. If this difference is large, even a prediction success rate of less than 50% can allow useful optimization.

This heuristic optimization technique can also use several different prediction functions; providing the same is used for logging and then replaying a single event or groups of internal events. The choice of prediction function to be used can be made according to the state of the application or its environment, for example starting from a knowledge database or rules. This change can then be stored in the logging data stored by the intermediate application. This heuristic optimization technique can also be used auto-adaptively, by evaluating its success rate during logging and by initiating a change of said function based on the value of this success rate or on its variation.

An example of the prediction function used in this heuristic optimization technique comprises a prediction of the order of occurrence of internal events based on the order of internal events coming from different clients.

Figure 9:
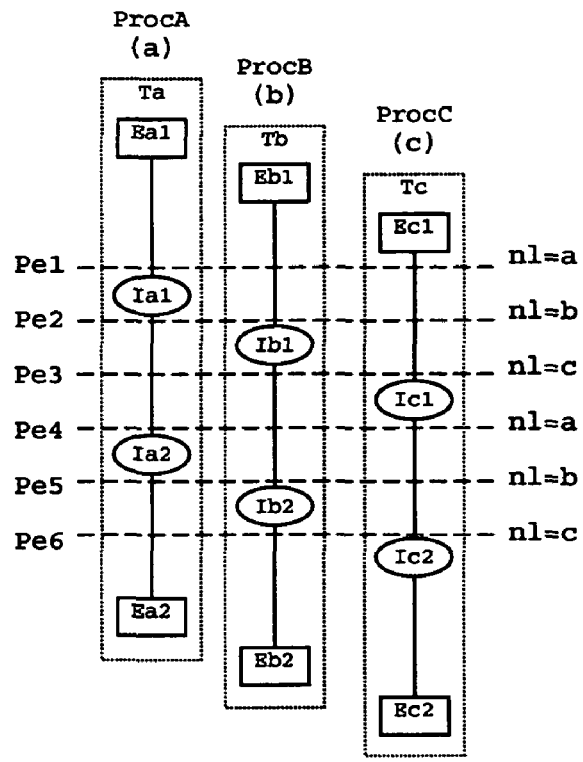
FIGS. 9 and 10 are symbolic diagrams illustrating an example of optimization, by heuristic compression, of the logging of non-deterministic internal events during different scheduling of internal events between two external events, in several simultaneous processes on an operational node.
Figure 10:
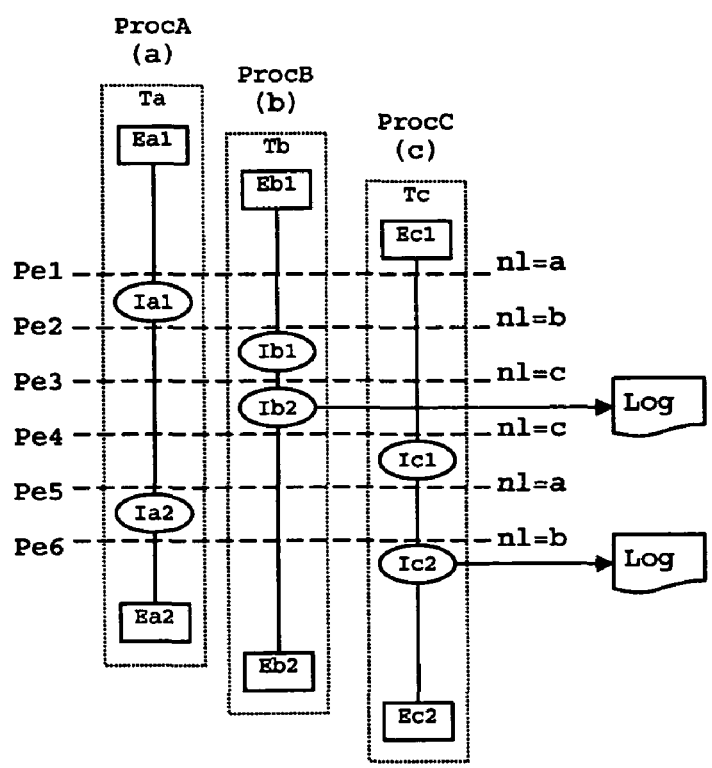

FIGS. 9 and 10 illustrate the occurrence of external and internal events participating in three processes ProcA, ProcB, ProcC, with identifiers rated respectively as "a", "b" and "c", for example executing three tasks Ta, Tb, Tc launched by three different clients respectively. These various tasks each comprise, for example, a first external event Ea1, Eb1, Ec1, and a second external event Ea2, Eb2, Ec2. Between these first and second external events, each of these tasks includes the initiation of two internal non-deterministic events. In FIGS. 9 and 10, the successive internal events for the task Ta are referenced Ia1 and Ia2, those of the task Tb are referenced Ib1 and Ib2, and those of the task Tc are referenced Ic1 and Ic2. These internal events Ia1 to Ic2 can be different from each other, or even involve a single determined resource, for example lock allocations to a single set of shared memory area.

During tasks that are approximately concurrent, and in particular when they have similar or common parts and/or have similar execution times, a prediction function consists of predicting that the order of occurrence of the intermediate internal events Ia1, Ib1, Ic1 will be the same as the order of occurrence of the external events preceding them.

While the master application is running, the order of occurrence of the first external events Ea1, Eb1, Ec1 on the operational node OP is recorded by the intermediate application, for example in the internal logging process PlogOP. For example, this order of external events comprises the succession of identifiers of the processes associated to these external events, or the sequence of the values "a b c".

On each detection of a new internal event concerning this resource, the prediction function makes a prediction of the result of this internal event, i.e. the identity of the process which will obtain the lock over this resource, i.e. the one which has just requested it. This predicted result will then be calculated by comparing the identity of the last process having obtained the lock over this resource, with this order of external events.

Thus, the prediction function will make a set of predictions Pe1 to Pe6, each shown by a dotted line and whose result is shown at its right hand end.

FIG. 9 illustrates the values of predictions made for each occurrence of an internal event, in the case where these internal events follow the order of external events. From the order of external events "a b c" and from the last internal event which occurred, the prediction function will make a prediction forming the sequence of values "a b c a b c", which will be revealed just in these six cases. In the context of an heuristic optimization, the internal logging process PlogOP will therefore have no requirement to forward logging data for these internal events, as they have been correctly foreseen by the prediction function.

FIG. 10 illustrates the prediction values made for each occurrence of an internal event, in the case where these internal events do not follow the order of external events exactly, the task Tb of the process PrB for identifying "b" being executed more rapidly than the two other tasks. From the order of external events "a b c" and from the last internal event which occurred, the prediction function will make a prediction forming the sequence of values "a b c c a b". It appears that two predictions Pe3 and Pe6 will be revealed as false, which will lead the internal logging process PlogOP to forward logging data on two occasions. This logging data will therefore include the value "c" in a transmission L1 on completion of the third prediction Pe3 which has been revealed as incorrect, then the value "c" in a transmission L2 on completion of the sixth prediction P6 which has also been revealed as incorrect.

Despite these incorrect predictions Pe3 and Pe6, it is clear that this heuristic optimization will have allowed the internal logging process PlogOP to affect only two transmissions L1 and L2 instead of the six that would have occurred in its absence. This saving of four transmissions out of six represents a work time sufficiently larger than in the internal calculations and operations which are needed to implement this optimization technique, and can therefore provide a significant increase in performance, in particular in the operational node.

Further more, for some internal events where a standard implementation by the operating system will produce a non-deterministic behaviour, it is possible to use a technique of optimization by semantics changing. This technique comprises an amendment to the implementation of such events in the node, in order to give them a behaviour which will be deterministic. The intermediate application makes this amendment identically in the operational node and the secondary node(s), which makes the results of these changed internal events predictable. This amendment to the implementation will be made dynamically by an interposition technique through a "metaprocess" which replaces an original event implementing routine R by an amended routine RM implementing an amended behaviour for this event. The technique used to implement this amendment is similar to that described above (c.f. FIG. 7) for adding recording probes in the prologue and epilogue, but may include an amendment to the code of the central part for the amended routine. This implementation amendment is produced transparently for the master application and does not alter pre-existing elements of the operating system. By using one of these amended routines in the master application, permanently or at least over a determined and stored execution interval, it is thus possible to log the master application evolution, without having to store the results of said changed events. The use of the same amended routines over the same intervals as those for executing a replay application, thus allows to maintain the reproducibility of the master application, at the same time improving the performance of the logging and the replay.

This amended behaviour is designed so as to comply with the same specifications as the original behaviour and to be fully compatible with it, for example by planning that, from a given situation where the original routine could have sent a number of different results, the amended routine provides only results which could have been provided by the original routine and are therefore envisaged by the master application and the operating system.

This technique of optimization by semantic change enables a reduction of the number of non-deterministic internal events, whose result must be logged in the operational node to be capable of replay during the restoration of a restart application.

Figure 16:
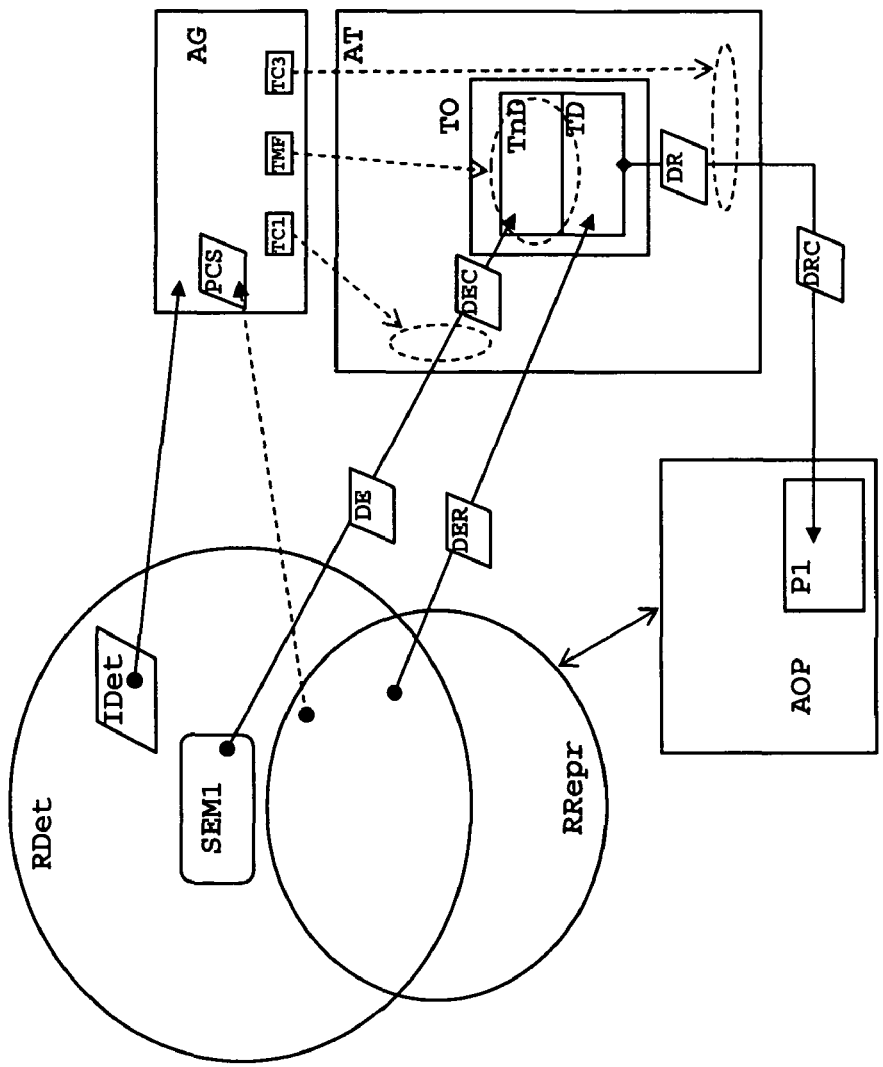
FIG. 16 is a diagram illustrating the interactions used by a semantic change.

An example of the operation and the interaction of the different parties is illustrated graphically in FIG. 16.

A processing agent AT, for example in the system software, carries out an operation which will forward a result DR to a process, for example a logged process P1. For many operations or events, in particular internal, said operation is implemented by an operational process TO, which is by its nature deterministic compared with a set of resources RDet, termed determinant.

From the resources accessible to the process P1, some can be termed reproducible resources RRepr from knowledge of the state of this process P1. Said reproducible resources comprise in particular resources whose state depends exclusively on it.

In the operation of the processing agent AT, processing the TO operation can comprise a processing part TD which is deterministic as regards to reproducible resources RRepr of the process PI, for example because it uses only DER data coming from said reproducible resources.

In the case where the operation process TO comprises another part of processing using personal data coming from SEM1 resources not included in the reproducible resources RRepr of the process P1, it is common for the result of this TnD part, and thus all the TO processing, not to be deterministic as regards to the process P1 invoking it.

In such a situation, this semantic change technique may consist of using a management agent AG to amend the processing agent's behaviour or the data which it uses or produces, in order that the operation resulting from this amendment is deterministic compared with the reproducible resources RRepr.

This managing agent can use a functioning modifying treatment TMF to amend the internal operation of the TO operating process.

It can also use the input data DE output from the determinant resources RDet but not reproducible (RRepr) as regards to the process P1, to compensate for variations to the result DR capable of constituting a non-deterministic source for said same process P1. Such a compensation can be carried out by TC1 modifying the input data DE into compensated input data DEC, or by TC2 modifying the result data DR into compensated result data DRC.

This managing agent AG can also choose or regulate the modifications TMF, TC1, TC2 which it made, depending on one or more semantic change parameter PCS, in order to optimize the efficiency of the global processing AT and AG. In order to remain reproducible between a logging JOP and a replay RSB, it is sufficient that the variations to this semantic change parameter PCS are determined only by data from the reproducible resources RRepr, or that its variations are stored in the logs UL, KL during logging and are read and applied in the same way during the replay RSB.

This change of behaviour can concern in particular aspects affecting the management of several processes competing for a given resource.

Figure 11:
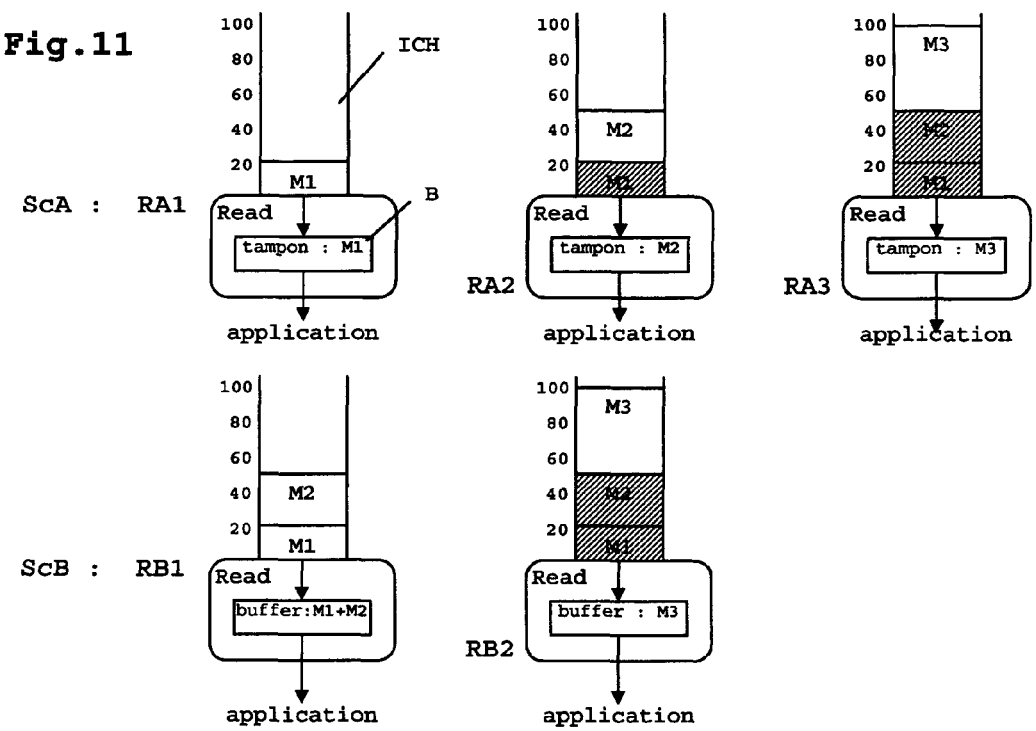
FIG. 11 is a symbolic diagram illustrating the non-determinism of a reading operation by the "read" routine in a system of the "Unix" type.
Figure 12:
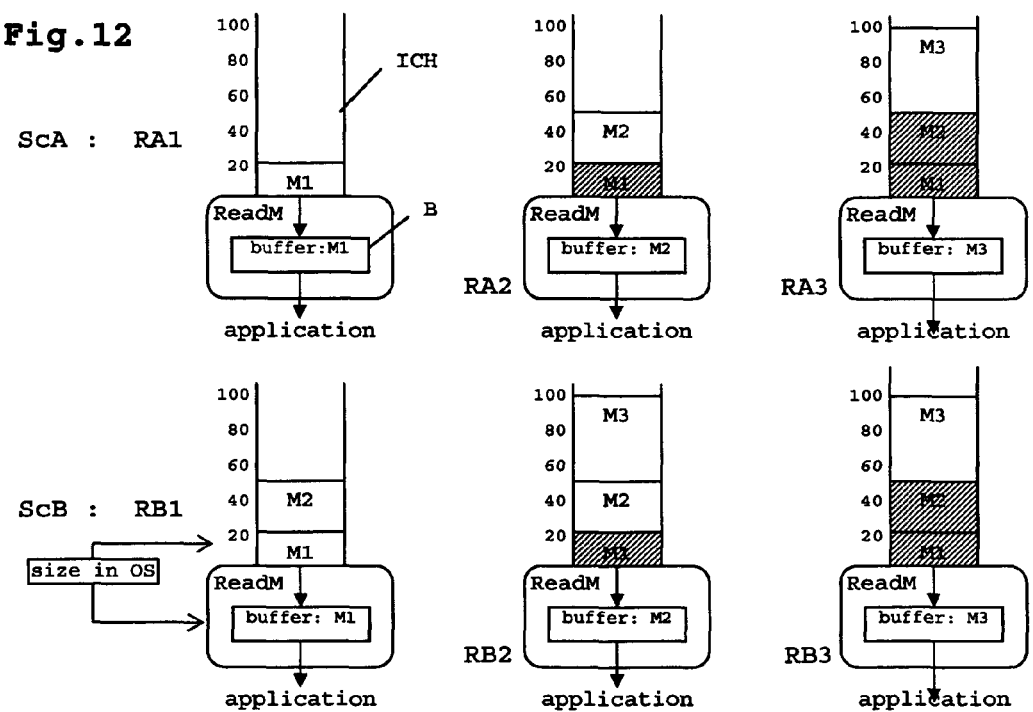
FIG. 12 is a symbolic diagram illustrating one behaviour of this same routine, made deterministic by dynamic semantic changing.

FIGS. 11 and 12 illustrate an example of using this optimizing technique by semantic change to make deterministic an operation to read received messages by using the "read" routine in a Unix-type environment.

In its standard implementation, the "read" routine, initiated by an application, uses a zone of buffer memory B to read messages in an input channel ICH and forward these to said application. The messages are received in the system in the form of successive data which are stored in a memory zone forming the input channel, as and when they arrive. According to its configuration, the "read" operation can use a buffer of different sizes, but this buffer is used in its entirety for each reading in the input channel.

In this example, the application uses a succession of "read" operations for the buffer B of size "50" to receive three messages M1, M2, M3 which reach it successively through the input channel ICH. These three messages represent data volumes equalling "20", "30" and "50" respectively. However, the speed at which data arrives in the input channel, on the one hand, and the speed of reading operations, on the other hand, can vary from one another in a way which cannot be predicted at the stage of a logging or replay.

FIG. 11 thus represents two different possible scenarios for reading the same three messages using an original "read" routine.

In a first scenario SCA, a first reading RA1 is made as only the data from the first message M1, size "20", has arrived. The buffer B is not completely filled, and the operation returns a result corresponding to the content "M1" and a data size of "20". A second reading RA2 is then made after the arrival of the second message M2 alone, which returns a result corresponding to the content "M2" and a data size "30". A third reading RA3 is then made after the arrival of the third message M3, which returns a result corresponding to the content "M3" and a data size "50". For example, for the size of data received by the application, this first scenario A thus returns a set of three results equal to "20, 30, and 50".

In a second scenario SCB, a first reading RB1 is taken as the same first and second messages M1, M2 have already arrived, which returns a result corresponding to the content "M1, M2" and a data size of "50". A second reading RB2 is then made after the arrival of the third message M3, which returns a result corresponding to the content "M3" and a data size of "50". For the size of the data received by the application, this first scenario SCA thus returns a set of two results equalling "50, 50", this for reading the same messages.

These two scenarios therefore return different results "20, 30, 50" for one and "50, 50" for the other. In this, the standard system routine implementing the "read" operation implements a non-deterministic event from the point of view of the application, for logging the master application as well as for replaying a restart application.

For the same situation as in FIG. 11, FIG. 12 represents the single scenario ScU which will be obtained by using an amended "readM" routine instead of the original "read" routine.

In this example, the amended routine recognizes the actual length of each of the messages received and reads in the input channel ICH only the data corresponding to a single message, even if the buffer B is not filled and there is still data to read in the input channel ICH. In the case of the logging of the master application, the amended routine recognizes the actual length of the messages M1, M2, M3 using an external event logging mechanism corresponding to the receipt of these same messages, for example the IPlogOP module. In the case of a replay while the restart application is being restored, the amended routine recognizes the actual length of the messages M1, M2, M3 using an external event replay mechanism corresponding to the receipt of these same messages, for example the IPlogSB module.

These two different arrival scenarios SCA, SCB thus give a single behaviour for the reading operation, in the occurrence of a single set of three results equalling "20, 30, 50" for the size of the data received by the application.

Likewise, for other sizes of the buffer B, an original "read" routine producing different sets of results is possible.

Thus, the following results can be obtained for a buffer size of "20", for example: "20, 20, 20, 20, 20" or "20, 20, 10, 20, 20, 10".

The following results can be obtained for a buffer size of "100", for example: "20, 30, 50" or "50, 50" or "20, 80" or "100".

On the other hand, for each buffer size, a "readM" routine thus amended can give only a single set of results.

Thus, for a buffer size "20", the set of results obtained will be "20, 20, 10, 20, 20, 10".

For a buffer size "100", the set of results obtained will be "20, 30, 50".

The "readM" routine thus amended therefore implements a deterministic behaviour for the internal event corresponding to such a reading operation.

FIGS. 13 to 15 illustrate another example of the use of this technique of optimization by semantic change, used to make deterministic a multiplexed reading operation initiated by an application process implementing a queuing loop and capable of receiving data from a number of input/output (I/O) channels specifically associated to a number of file descriptors. This example is based on the use of the "select" routine in an environment of the Unix type, but could also be applied to the use of the "poll" routine.

In this example, three messages M1, M2, M3 with contents equalling "a", "b" and "c" respectively are received by the node operating system OS, addressed to two different channels ICH1, ICH2.

This example can be applied in particular to the receipt of data in the form of a "stream" by the first channel ICH1, and data in the form of messages or packets of the TCP type by the second channel ICH2. In the operating system OS, two TCP packets, followed by a "stream" packet are then received as three successive messages M1, M2, M3 with content equalling "a", "b" and "c" respectively.

As it receives these and according to its workload, the operating system OS processes and distributes this data in the channels ICH1, ICH2 corresponding to their type. At a given instant during its execution, the application calls up the "select" routine to initiate a reading operation for the different channels by which it can receive messages.

In its standard implementation, the "select" routine reads the queuing data in the first channel ICH1, followed by that in the second channel ICH2, and forwards this immediately to the application, in the order in which it read them.

Now, the speed at which data arrives in the operating system OS, the speed of its processing by the operating system and therefore its speed of arrival in the input channels, on the one hand, and the speed of execution by the application of a succession of read operations, on the other, can vary from one another in a way which cannot be predicted at the stage of a logging or replay.

In a first scenario SCA, illustrated in FIG. 13, the application initiates a multiplexed reading by the "select" routine at a first instant IA, as the three messages have already arrived in the two input channels ICH1, ICH2. When the "select" routine reads the data, it therefore reads first the third message contained in the first channel ICH1, followed by the two first messages M1, M2 in the second channel ICH2. The "select" routine then forwards this data in the order of reading and the reading operation thus produces a result comprising the data set "c, a, b".

In a second scenario SCB, illustrated in FIG. 14, the application initiates a multiplexed reading by the "select" routine at a first instant IB, as only the first two messages have arrived in the second input channel ICH2. When the "select" routine reads the data, it therefore reads only the two first messages M1, M2 in the second channel ICH2 and forwards this data to the application in the order of reading, or the set "a b". During the next reading, after the third message M3 has arrived in the first channel ICH1, the "select" routine reads this third message and forwards it to the application. In said second scenario B, the reading operation by the original "select" routine therefore produces a result comprising the data set "a b c".

These two different scenarios SCA, SCB therefore return different results, "c a b" for one and "a b c" for the other. In this, the standard system routine implementing the "select" operation implements a non-deterministic event from the point of view of the application, for logging the master application as well as for replaying a replay application.

For the same situation as in FIGS. 13 and 14, FIG. 15 represents the single result which will be obtained by using an amended "selectM" routine instead of the original "select" routine.

In this example, the amended routine recognizes the order in which the messages arrive in the operating system OS, and reads the messages in the order in which they arrived. Moreover, to reduce the risks of ambiguity, the amended routine sends only a single file descriptor each time. The amended routine can obtain information on the order in which the messages arrive, for example by examining the content of messages in the input channels ICH1, ICH2, or from logging or replay data.

These two different arrival scenarios SCA, SCB thus give a single behaviour for the multiplexed reading operation, in the event a single set of three results equalling "a b c".

By thus amending the method of operation of certain routines implementing the behaviour of internal events which were not deterministic in a standard environment to make them deterministic, it is clear that a reduction of the number of non-deterministic events is obtained. When this amendment is applied identically during logging in the master application and during replay in a restart application, the number of events which must be logged to be able to obtain, on completion of the replay, a restart application which is in a state corresponding to that of the master application or which has a satisfactory continuity of operation with said master application, is reduced.

Therefore, it is clear that this technique of optimization by semantic change can improve the performance of the logging and replay operations, and thus the intermediate application.

In fact, according to the routines to which this technique of semantic change is applied, and according to the nature of the amendment made to them, this can result in a minor fall-off in performance in said routine compared with its original behaviour. However, given the slow speed of logging operations, the savings generated in terms of the number of operations to be logged can allow significant improvement in the overall performance of the master application within the framework of the intermediate application.

In this description, it can be seen that the mechanisms of the intermediate application are in the main implemented by processes or modules being executed in the user space of the operational node or of secondary nodes. In particular, this means the logging or replay processes, external or internal, identified here in the intermediate application INT (FIG. 1) under the references "Plog" (FIG. 2), "IPlogOP" and "IPlogSB" (FIG. 3), "PlogOP" and "PlogSB" (FIG. 4), "PRE" (FIG. 5) and "PRI" (FIG. 6), "META" (FIG. 7).

In contrast, the mechanisms being executed in the system space comprise above all the interposition modules, or those for adding or amending functions, which are managed from the application modules. This in particular means modules identified here under the references "DISP" (FIG. 3), and "ipfilter" (FIG. 5). Certain of these kernel modules can also be loaded or unloaded from the application modules as required.

The fact that the execution and the "life" of the intermediate application takes place in the user space enables to limit the interactions with the operating systems of the different nodes. This feature in particular provides a flexibility in deployment and management, a certain independence towards operating systems and their optional heterogeneity, limits the risks of type or release incompatibility, and can limit interventions in the system space of the nodes which are not involved, or only to a lesser degree, in the deployment of said intermediate application. This independence towards operating systems can also limit development times and costs, by avoiding too much in-depth intervention in pre-existing elements of the system space, and retaining a certain commercial and technical independence towards specifications and changes to these operating systems and towards the policies of the organizations which manage them.

An intermediate application as described above can be implemented in different ways and according to different combinations to provide users or managers of a cluster with a support or management service for other applications. Such a service can in particular be obtained in the form of a network software product of the "middle-ware" type, allowing the management, optimizing or reliability improvement, in a cluster, of one or more applications in their original version ("legacy"), at the same time providing functions of flexibility or additional security or fault tolerance, for example adapted to the nature of the cluster.

The use of such an intermediate application can more particularly take the form of securing services provided by these applications to their clients. Each application will therefore be able to be treated as a master application and be restored in the form of a restart application to replace the master application for its clients as necessary.

The services provided by the applications being executed in all or part of a given node can also be shifted to one or more other nodes dynamically and on demand, by freeing their original node completely. Therefore, it will be possible to implement all the hardware or software interventions wanted on this node, whether these be maintenance, trials, upgrades or replacement.

Such an intermediate application can be used in particular to implement an environment of the "middleware" type, comprising functionalities for distributing the workload (load balancing) between the different nodes, to optimize the use of the different hardware, in particular according to its power, availability, or its geographic situation in the network, for example its remoteness from its clients or the data which is used.

Obviously, the invention is not limited to the examples which have just been described and numerous amendments may be made thereto, without departing from the framework of the invention.

The invention claimed is:

1. Method for managing a software operation implemented within the execution of an application process, termed managed process, executed by at least one computer in the context of an application, termed managed application, said operation being carried out by at least one software resource, termed processing agent, and returning to the managed process, or to the managed application, at least one result datum obtained in accordance with an operation processing comprising at least one intrinsically non-deterministic phase with respect to a state, before said operation, of at least one first group of resources, termed reproducible resources, included in the resources accessible by the managed process or by the managed application, this method comprising the following steps:
execution, from at least one executable file, of a program instruction initiating an implementation of the managed operation;
intervention by a management software agent, external to the managed application, in the software functioning of the computer in order that the managed process or the managed application takes account of a result datum reproducible in an unambiguous manner based on the state of the reproducible resources before the managed operation.

2. Method according to claim 1, characterized in that the management agent functions in a manner external to the processing agent.

3. Method according to claim 1, characterized in that the state of the reproducible resources depends exclusively on the execution of the managed process or of the managed application.

4. Method according to claim 1, characterized in that the intervention step comprises a modification of the functioning of the processing agent in order to make said functioning deterministic with respect to the reproducible resources.

5. Method according to claim 4, characterized in that the operation processing is intrinsically deterministic with respect to a state of a second group of resources, termed determinant resources, which may include all or some of the reproducible resources, and in that the modification of the functioning of the processing agent is carried out or controlled by the management agent based on data, termed determinant, originating from the state of the determinant resources before the managed operation.

6. Method according to claim 1, characterized in that the operation processing is intrinsically deterministic with respect to a state of a second group of resources, termed determinant resources, which may include all or some of the reproducible resources, and in that the intervention step also comprises a compensation process, of a deterministic nature with respect to the determinant resources, thus compensating the non-deterministic nature of said operation processing, by using at least one item of data, termed determinant, which is dependent on the determinant resources.

7. Method according to claim 6, characterized in that the compensation process, also comprises the following steps:
- interception of the result datum returned by the operation processing, before its being taken into account by the managed process or by the managed application;
- from said result datum, calculation of a compensated result datum;
- forwarding of said result datum to the managed process or to the managed application instead of the result datum returned by the operation processing.

8. Method according to claim 6, characterized in that the operation processing receives at least one datum termed input, originating from at least one resource, termed target resource, external to the reproducible resources, the compensation process also comprising the following steps:
- interception of the input datum before its being taken into account by the operation processing;
- from said input datum, calculation of a compensated input datum;
- forwarding of said item of compensated input data to the operation processing, instead of the input datum originating from the target resource.

9. Method according to claim 1, characterized in that, during a logging of a sequence of operations, within the execution of a logged process belonging to a logged application, carried out in order to store at least one log file enabling a restart process to replay a sequence, termed replayed, of operations corresponding to the operations of the logged sequence, the method manages, within said logged sequence, at least one non-deterministic operation, termed logged operation, in order to make it deterministic with respect to the logged process or with respect to the logged application.

10. Method according to claim 9, characterized in that, during a replay of a sequence of operations within the execution of a restart process belonging to a restart application, said replay using logging data representing the execution of a logged sequence of operations within the execution of a logged process,
- for at least one non-deterministic operation, termed replayed operation, belonging to said replayed sequence and corresponding to an operation logged within said logged sequence, the method manages said replayed operation in order to make it deterministic in order that the restart process takes into account a result datum corresponding to the result taken into account by the logged process on completion of the logged operation.

11. Method according to claim 9, characterized in that the intervention phase comprises at least one sub-phase dependent in a univocal manner on at least one datum, termed semantic change parameter, varying during the execution of the replayed sequence in a same manner as during the execution of the logged sequence.

12. Method according to claim 11, characterized in that, during the execution of a logged or replayed sequence, the semantic change parameter presents at least one variation dependent in a univocal manner on the state of the reproducible resources.

13. Method according to claim 11, characterized in that, during the execution of a logged or replayed sequence, the semantic change parameter presents at least one variation, termed logged variation, which is stored in the form of logging data, being usable during the replay, in order to vary the semantic change parameter in a manner corresponding to said logged variation.

14. Method according to claim 1, further comprising managing at least one operation initiated by an instruction executed from an executable file and comprising a call to a routine, termed original, external to said executable file, the execution of said instruction making a call to a routine termed modified, instead of said original routine, this modified routine implementing or initiating the implementation of the method.

15. Method according to claim 14, characterized in that the modified routine comprises at least one instruction executed within the system software and making a call to at least one management software agent, managing the implementation of the method and being executed in a user memory space of the computer of the managed process.

16. Method according to claim 1, further comprising managing at least one operation comprising at least one processing executed by a system software or within the system memory space of the computer.

17. Method according to claim 1, further comprising managing at least one operation returning a result dependent on the state or on the development of at least one resource shared between several processes or between several applications.

18. Method according to claim 5, further comprising using at least one item of determinant data originating from system software or originating from the operating system of the computer.

19. Method according to claim 5, further comprising managing a data reading operation in a buffer memory comprising at least one reception queue of software objects in the form of groups of data of sizes capable of being different, the management agent receiving from system software at least one item of determinant data representing a size of the next object to be read in said queue, and using said item of determinant data in order to read or take into account in said buffer memory only the data corresponding to the size of said next object to be read.

20. Method according to claim 5, further comprising managing an operation to read data originating from a plurality of reception channels, each comprising at least one queue for receiving software objects, the management agent receiving from system software at least one item of determinant data representing an order of arrival of the different objects, and using said item of determinant data in order to read or in order to take account of said different objects in an order corresponding to that of their arrival.

21. Method according to claim 10, further comprising implementing functioning management of at least one application process termed logged, and comprises the following steps:
- logging all the events of at least one given type which occurred during an execution of said logged process since a given point termed restart and up to a point termed interruption, and storage of a log originating from said logging;
- starting from a restart process in a state corresponding to the logged process restart point state, replaying said events from a journal by said restart process, thus bringing the restart process into a state corresponding to the state of the logged process at the point of interruption.

22. Method according to claim 21, characterized in that the state of the logged process at the restart point is captured and stored in the form of restart point data, which is used to restore the restart process to the state of the restart point before applying the replay step.

* * * * *